US008963685B2

(12) United States Patent
Garcia

(10) Patent No.: US 8,963,685 B2
(45) Date of Patent: Feb. 24, 2015

(54) APPARATUS AND SYSTEM FOR AND METHOD OF REGISTRATION, ADMISSION AND TESTING OF A CANDIDATE

(75) Inventor: Ruben Garcia, Chicago, IL (US)

(73) Assignee: Innovative Exams, LLC, Chicago, IL (US)

(*) Notice: Subject to any disclaimer, the term of this patent is extended or adjusted under 35 U.S.C. 154(b) by 253 days.

(21) Appl. No.: 13/497,017

(22) PCT Filed: Sep. 20, 2010

(86) PCT No.: PCT/US2010/049541
§ 371 (c)(1),
(2), (4) Date: Mar. 19, 2012

(87) PCT Pub. No.: WO2011/035271
PCT Pub. Date: Mar. 24, 2011

(65) Prior Publication Data
US 2012/0176220 A1 Jul. 12, 2012

Related U.S. Application Data

(60) Provisional application No. 61/243,787, filed on Sep. 18, 2009.

(51) Int. Cl.
G05B 19/00 (2006.01)
G09B 7/00 (2006.01)
(52) U.S. Cl.
CPC ........................................ G09B 7/00 (2013.01)
USPC ......... 340/5.83; 340/5.8; 340/5.81; 340/5.82; 340/6.1; 434/350; 434/118
(58) Field of Classification Search
CPC ....................................................... G09B 7/00
USPC ......................................... 340/5.83; 434/362
See application file for complete search history.

(56) References Cited

U.S. PATENT DOCUMENTS 4,486,180 A    12/1984  Riley
4,993,068 A *   2/1991  Piosenka et al. .............. 713/186
(Continued)

FOREIGN PATENT DOCUMENTS

JP    2009181358    8/2009
WO   WO 98/09401    3/1998
(Continued)

OTHER PUBLICATIONS

Eng, ABC News, "Device Seeks to Jam Covert Digital Photographers", Sep. 20, 2005.*
(Continued)

Primary Examiner — Daniel Wu
Assistant Examiner — Frederick Ott
(74) Attorney, Agent, or Firm — Cook Alex Ltd.

(57) ABSTRACT

The present disclosure is directed to an apparatus and system for and method of registering, admitting and testing of a candidate. Test candidate can be registered and admitted through verification of identity using biometric comparisons and third party identification systems. Scanning of identification documents and comparison with security information database can authenticate the validity and authenticity of identification documents. Authentication of testing candidates can be accomplished by comparison of biometric data of candidate against biometric data contain in identification document. Testing can be conducted on an apparatus remotely located from a proctor monitored administrative station or apparatus. The remote testing station can detect and prevent individuals from cheating, detect unauthorized objects, and can prevent or detect unauthorized copying of an examination or portions thereof.

16 Claims, 25 Drawing Sheets

(56) References Cited

U.S. PATENT DOCUMENTS

| | | | |
|---|---|---|---|
| 5,195,033 | A | 3/1993 | Samph et al. |
| 5,204,813 | A | 4/1993 | Samph et al. |
| 5,218,528 | A | 6/1993 | Wise et al. |
| 5,513,994 | A | 5/1996 | Kershaw et al. |
| 5,546,598 | A | 8/1996 | Yamaguchi et al. |
| 5,700,149 | A | 12/1997 | Johnson, III et al. |
| 5,857,028 | A | 1/1999 | Frieling |
| 5,915,973 | A * | 6/1999 | Hoehn-Saric et al. ........ 434/350 |
| 5,947,747 | A | 9/1999 | Walker et al. |
| 6,149,440 | A | 11/2000 | Clark et al. |
| 6,325,631 | B1 | 12/2001 | Kouba et al. |
| 6,418,298 | B1 | 7/2002 | Sonnenfeld |
| 6,612,928 | B1 | 9/2003 | Bradford et al. |
| 6,615,020 | B2 | 9/2003 | Richter et al. |
| 6,616,453 | B2 | 9/2003 | Kouba et al. |
| 6,618,806 | B1 | 9/2003 | Brown et al. |
| 6,678,499 | B1 | 1/2004 | Silverbrook et al. |
| 6,681,098 | B2 | 1/2004 | Pfenninger et al. |
| 6,709,333 | B1 | 3/2004 | Bradford et al. |
| 6,758,394 | B2 | 7/2004 | Maskatiya |
| 6,853,739 | B2 | 2/2005 | Kyle |
| 6,871,287 | B1 | 3/2005 | Ellingson |
| 6,996,367 | B2 | 2/2006 | Pfenninger et al. |
| 6,999,714 | B2 | 2/2006 | Pfenninger et al. |
| 7,099,620 | B2 | 8/2006 | Miller |
| 7,165,269 | B2 | 1/2007 | Winneg |
| 7,299,067 | B2 | 11/2007 | Riggs |
| 7,308,581 | B1 | 12/2007 | Geosimonian |
| 7,356,706 | B2 | 4/2008 | Scheurich |
| 7,581,114 | B2 | 8/2009 | Kanno |
| 2002/0030582 | A1 | 3/2002 | Depp et al. |
| 2003/0073064 | A1 | 4/2003 | Riggs |
| 2003/0073065 | A1 | 4/2003 | Riggs |
| 2003/0108373 | A1 * | 6/2003 | Schofield ...................... 400/103 |
| 2004/0010720 | A1 | 1/2004 | Singh et al. |
| 2004/0015243 | A1 | 1/2004 | Mercredi et al. |
| 2004/0161728 | A1 | 8/2004 | Benevento, II et al. |
| 2006/0112278 | A1 | 5/2006 | Cohen et al. |
| 2006/0160056 | A1 | 7/2006 | Fogarty, Jr. |
| 2007/0048723 | A1 | 3/2007 | Brewer et al. |
| 2007/0117082 | A1 | 5/2007 | Winneg et al. |
| 2007/0117083 | A1 | 5/2007 | Winneg et al. |
| 2008/0293033 | A1 | 11/2008 | Scicchitano et al. |

FOREIGN PATENT DOCUMENTS

| | | |
|---|---|---|
| WO | WO 02/103597 | 12/2002 |
| WO | WO 2007/020942 | 2/2007 |

OTHER PUBLICATIONS

PCT International Search Report for PCT/US10/49541 dated Nov. 5, 2010.

* cited by examiner

*Fig. 5*

Welcome to the Innovative Exams™ Station®

Station Number: 1003

Chicago, IL 60606

Please confirm that you are at the correct Station® by identifying the Center Number on your confirmation letter Select Next to begin

Fig. 6

Find Reservation

Please enter your 5 digit confirmation code
or last name and email address

Confirmation Code: | 31827 |

Last Name: | |

And

Email Address: | |

Select Next to find your Pending Reservation

Fig. 7

Reservation Confirmation

| | |
|---|---|
| Name: | Ruben Garcia |
| Sponsor: | |
| Test: | State of Illinois Real Estate Demo Exam |
| Appointment: | 4:00 PM - 4:45 PM |
| Exam Length: | 30 minutes |

If this is the correct reservation, press next
to continue the admission process

Select Next to continue

Scan ID

Scan ID as shown above

Scan ID

Select Next to continue

Fig. 11

Name: RUBEN ARTURO GARCIA
Address:
DOB:
Gender: M

ID Type: Passport
ID Number:
Authority: United States
Issued On:

ID | Alerts | Security ID Images

| Pass/Fail | Alert | Risk Factor | Result |
|---|---|---|---|
| Failed | Overlay Response | 0.70 | Verified the response of an element on the document overlay. |
| Passed | Ultraviolet Response | 0.00 | Verified the response of an element on the ultraviolet image. |
| Passed | Overlay Pattern | 0.00 | Verified the presence of a pattern on the document overlay. |
| Passed | Near-Infrared Response | 0.00 | Verified the response of an element on the near |
| Passed | Visible Pattern | 0.00 | Verified the presence of a pattern on the visible image. |
| Passed | Composite Check Digit | 0.00 | Verified that the composite check digit is correct. |
| Passed | Document Number Check Digit | 0.00 | Verified that the document number check digit is correct. |
| Passed | Personal Number Check Digit | 0.00 | Verified that the personal number check digit is correct. |
| Passed | Expiration Date Check Digit | 0.00 | Verified that the expiration date check digit is correct. |
| Passed | Birth Date Check Digit | 0.00 | Verified that the birth date check digit is correct. |
| Passed | Issuing State Valid | 0.00 | Verified that the issuing state is valid. |
| Passed | Document Classification | 0.00 | Verified that the type of document is supported and is able to b |
| Passed | Birth Date Valid | 0.00 | Verified that the birth date is valid. |
| Passed | Issue Date Valid | 0.00 | Verified that the issue date is valid. |
| Passed | Expiration Date Valid | 0.00 | Verified that the expiration date is valid. |
| Passed | Document Expired | 0.00 | Checked if the document is expired. |

Fig. 18

Start Exam

Congratulations, you have completed the Innovative Exam™ admission process. Before you begin your exam, please make sure that you have put away all for your belongings in the locker box. Turn off all mobile phones and electronic devices.

Your session is being recorded and monitored remotely. The system will be required to randomly authenticate yourself during the testing process.

To register for an exam, go to www.innovativexams.com.

Select Next to start the exam

Start Over

Next

*Fig. 20*

Exam for: Ruben Garcia

Sep 07 2010 | Logged in as: ruben@innovativeexams.com

Time remaining: 00:29:16

1 of 10

The Kentucky Real Estate Commission determined that a buyer was damaged by the fraudulent action of a licensee in the amount of $50,000. If the responsible licensee does not pay the claim, the Commission may pay out from the Real Estate Education, Research, and Recovery Fund a MAXIMUM amount of:

○ $10,000.00
○ $20,000.00
○ $25,000.00
○ $50,000.00

Live Support

Ruben Garcias joined

Enter text here...

Send

For Support Call:

APPARATUS AND SYSTEM FOR AND METHOD OF REGISTRATION, ADMISSION AND TESTING OF A CANDIDATE

This is the national stage filing of International Application No. PCT/US10/049541 filed on Sep. 20, 2010 which claims the benefit of and priority to U.S. Provisional Patent Ser. No. 61/243,787 filed on Sep. 18, 2009, both of which are incorporated herein by reference in their entireties.

TECHNICAL FIELD

The present disclosure relates to identity authentication generally and more particularly to identity authentication and to administering and proctoring of examinations.

BACKGROUND

Many examinations, particularly high stakes examinations such as LSAT, GMAT, GRE and the like are usually administered in secure sites with one or more on-site proctors to observe the testing event. Typical duties of the proctor can include authenticating the identity of the test candidate, observing the testing event for instances of cheating or unauthorized copying of the exam, preventing use or possession of unauthorized items and the general administration such as presenting the exam, provision of scratch note paper and writing utensils. The proctor can also be responsible for timing of exam portions such as start and end times for different sections of the exam if any, and addressing general needs and questions of the individuals taking the exam.

In authenticating the identity of the test candidate, the on-site human proctor is trying to determine if the test candidate present at the test site is the person qualified and registered for the exam. Accordingly, the on-site proctor usually examines identification documents such as governmental identification cards including passports, driver's licenses, and military identification cards, among others to verify the authenticity of the identification document. In addition, the proctor compares the data on the identification documents with the candidate's registration information to determine that they match. Furthermore, authenticating the identity of the test candidate can involve comparing the biometric data on the identification document such as a facial image or fingerprint to the test candidate usually through visual comparison although fingerprint and other biometric data comparison may require the assistance of biometric recording or comparing device. Once the human proctor is satisfied of the authenticity of the identity of the test candidate present at the test site, the proctor can allow the candidate to sit for the exam.

Once the exam begins, the proctor may be required to monitor the timing of the test or sections of the test, and monitor the test candidates to prevent cheating and unauthorized copying of the exam. Preventing cheating and unauthorized copying of the exam has become more difficult with the advent of small personal electronic devices.

SUMMARY

In one aspect of the present disclosure a test candidate registration, admission and test administration system is provided having a first apparatus including a first processor, a first data storage device operably connected to the first processor, a first communication link operably connected to the first processor for transmitting and receiving data over a network, a first display operably connected to the first processor, and a first at least one input device operably connected to the first processor, wherein the first apparatus receives registration information of a test candidate and serves as a remote examination station; a second apparatus including a second processor, a second data storage device operably connected to the second processor, a second communication link operably connected to the second processor for transmitting and receiving data over the network and communicating with the first apparatus, a scanning device operably connected to the second processor to capture identification information from a test candidate's identification documents, a second display operably connected to the second processor, a second at least one input device operably connected to the second processor, and at least one biometric data recording device operably connected to the second processor for capturing biometric data of the test candidate, wherein the second apparatus captures biometric data and either provides testing administration functions and/or identity authentication; a biometric data processing algorithm stored on one or both of the first and second apparatus for comparing biometric data; and a document scanning and comparing algorithm stored on one or both of the first and second data storage device for extracting text, images and other indicia from the identification document information of the identification document and comparing identification information to registration information wherein either the second apparatus transmits the identification information and the biometric data captured from the test candidate to the first apparatus which compares the identification information and the biometric data captured from the test candidate to authenticate the identity of test candidate or the second apparatus compares the identification information and the biometric data captured from the test candidate to authenticate the identity of test candidate and test candidate to take a test.

In a second aspect of the present disclosure, an authentication apparatus is provided having a processor, a data storage device operably connected to the processor, a communication link operably connected to the processor for transmitting and receiving data over a network, a scanning device operably connected to the processor to capture identification document information from an identification document including biometric data, a display operably connected to the processor, a document scanning and comparison algorithm stored on the data storage device for extracting text and images and other indicia from the identification document information, at least one input device operably connected to the processor, at least one biometric data recording device operably connected to the processor, and a biometric data processing algorithm stored on the data storage device for comparing biometric data captured from the identification document and biometric data captured from a test candidate by the biometric data recording device to authentic the identity of the test candidate.

In a third aspect of the present disclosure a method of authenticating a test candidate identity is provided including the steps of: obtaining identification information from the test candidate; capturing a first set of biometric data from the test candidate; capturing biometric data and identification data from identification document; comparing first set of biometric data with identification document biometric data; determining if the biometric data match; and allowing the test candidate to access a test if the biometric data match.

BRIEF DESCRIPTION OF THE DRAWINGS

In the following detailed description, reference will frequently be made to the following views of the drawing, in which like reference numerals refer to like components, and in which:

FIG. 5 shows one embodiment of a screen shot of one step of the admission process according to the present disclosure;

FIG. 6 shows one embodiment of a screen shot of another step of the admission process according to the present disclosure;

FIG. 7 shows one embodiment of a screen shot of yet another step of the admission process according to the present disclosure;

FIG. 11 shows one embodiment of security and anti-counterfeit indicia examined and validated by one embodiment of an apparatus according to the present invention;

FIG. 18 shows one embodiment of a screen shot of another step of the admission process according to the present disclosure;

FIG. 20 shows one embodiment of a screen shot of a test question presented to a testing candidate according to the present disclosure;

DETAILED DESCRIPTION

As required, detailed embodiments are disclosed herein; however, it is to be understood that the disclosed embodiments are merely exemplary of present approach, which may be embodied in various forms. Therefore, specific details disclosed herein are not to be interpreted as limiting, but merely as a basis for the claims and as a representative basis for teaching one skilled in the art to variously employ the present approach in virtually any appropriate manner.

The present disclosure provides an apparatus and method for automated authentication of the identity of a testing candidate which authentication can also be supplemented by a remote or local human proctor. Also, the present disclosure provides apparatuses and methods for registering and authenticating a test candidate. In addition, the present disclosure provides apparatuses and methods for registering, authenticating a test candidate and administering an exam to the test candidate and may include the assistance of an on-site human proctor. Furthermore, the present disclosure provides apparatuses and methods for registering, authenticating a test candidate, administering an exam and remotely proctoring the exam.

Figure 1:
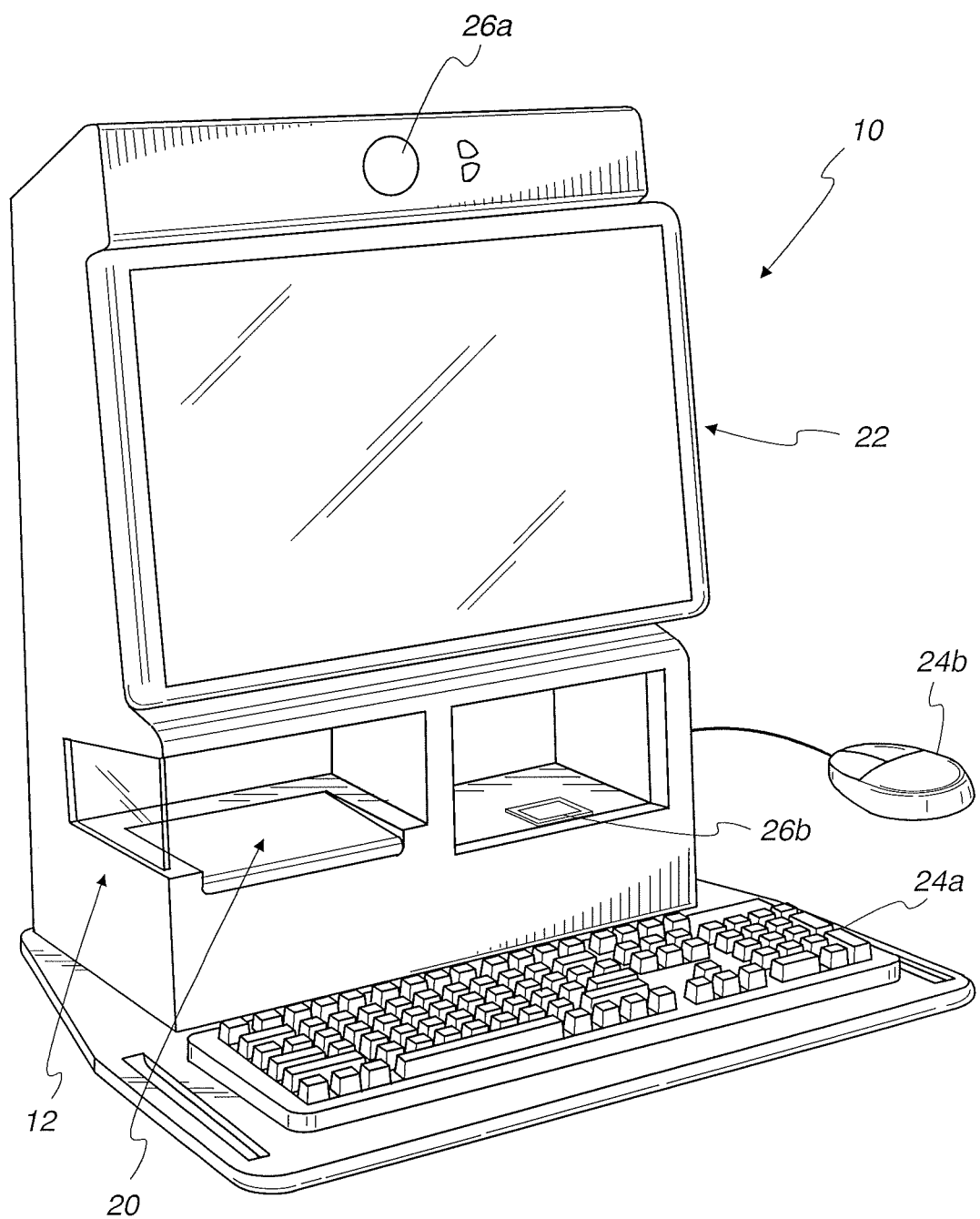
FIG. 1 shows a perspective view of one embodiment of an identification document and test candidate validation and authentication apparatus according to the present disclosure.
Figure 1A:
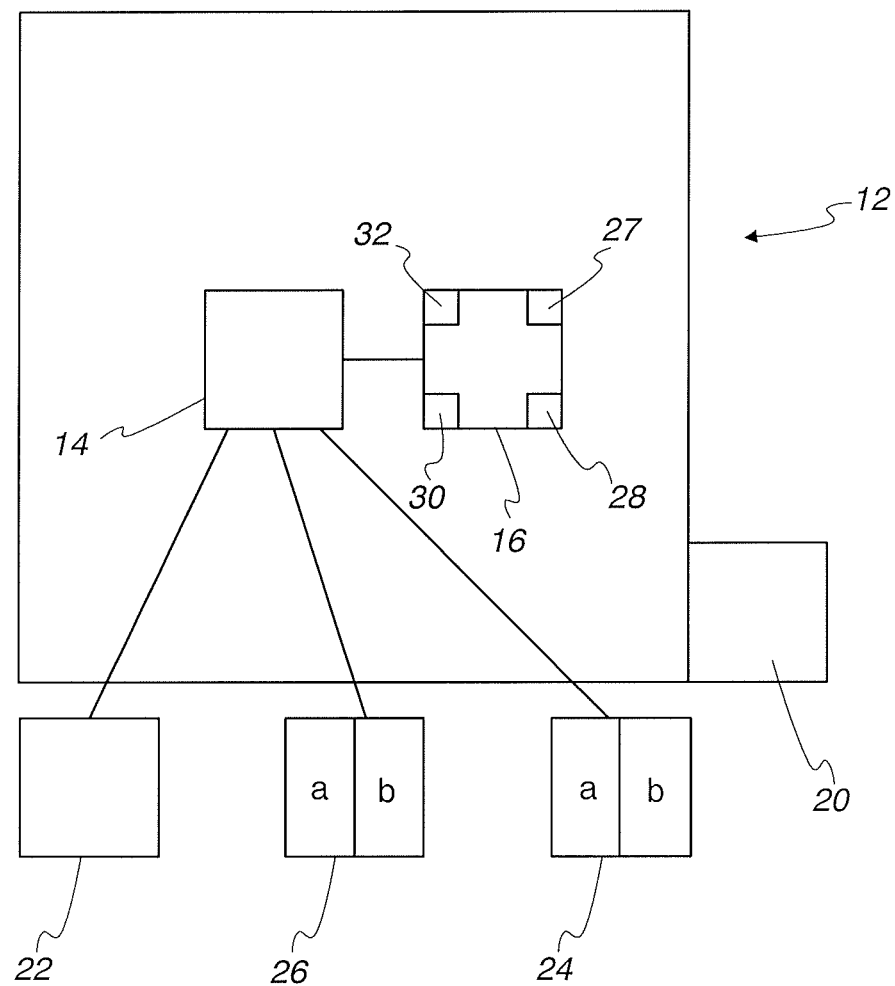
FIG. 1A shows a schematic view of the apparatus of FIG. 1.

In one embodiment, an identification authentication apparatus 10 is shown in FIGS. 1 and 1A. Apparatus 10 can include a computing device 12 which can have a processor 14, a data storage device 16 operably connected to the data processor 14, a scanning device 20 operably connected to the data processor 14, a document scanning and comparison algorithm 30 stored on the data storage device 16 for extracting text and images and other indicia provided on the identification document, a display 22 operably connected to the data processor 14, at least one input device 24 operably connected to the data processor 14, at least one biometric data recording device 26, a biometric data processing algorithm 27 stored on the data storage device 16 for comparing biometric data and a data processing algorithm 28 stored on the data storage device 16 for controlling the operation of the an identification authentication apparatus 10. In one embodiment, apparatus 10 can be in the form of a kiosk or self contained unit.

In one embodiment, the computing device 12 can be a personal computer, particularly OptiPlex 780 Ultra Small Form Factor having an Intel® Core™ 2 Duo E7500 with VT (2.93 GHz, 3M, 1066 MHz FSB) as data processor 14.

In one embodiment, the data storage device 16 can be a solid state drive or a hard disk drive such as a Western Digital 1 TB hard drive. Apparatus 10 can also include data storage such as random access memory for improving the operation of the data processor.

In one embodiment, scanning device 20 can be a digital document and/or card scanner. Scanning device 20 can capture identification information data typically found on identification documents such as passports driver's licenses, state issued identification cards, military identification cards. Identification document information can include textual information, biometric data such as an image of the face or of a fingerprint pattern of the authentic holder of the identification document and security and anti-counterfeit indicia. Textual information can include biographic and/or demographic information such as name, residential address, date of birth, hair color, and eye color, among others. In one embodiment scanning device 20 can have resolution, detection and capture capabilities to permit accurate capture of identification document data typically found on identification documents such as text having small font types, any biometric data such as a facial image, finger print, or retinal pattern, and security and anti-counterfeit indicia whether present in the visible spectrum or non-visible spectrum such as ultraviolet and infra red. In one embodiment, the scanning device 20 can be 3M AT 9000 Full Page Reader Scanner.

In one embodiment, display 22 can be a CRT or LED-type thin panel display. In one embodiment, display 22 can be a Dell E1909WDD. The at least one input device 24 can be a QWERTY-type keyboard 24a and mouse 24b as shown in FIG. 1. In one embodiment, the keyboard 24a and mouse 24b can be a Dell USB Keyboard and Dell USB Optical Mouse. Alternatively, in another embodiment, the at least one input device can be included with the display in the form of a touch screen display or touch-enabled display such as an Elo 1000 Series 1515L Touch Screen Monitor.

The at least one biometric recording device can be one or more of a palm print recording device, a palm vein pattern recording device, finger vein pattern recording device, an iris pattern recording device, a retinal pattern recording device, a fingerprint recording device, key stroke biometrics recording, signature capture writing pad, hand geometry scanning device, voice recording device and facial image recording device such as digital camera or digital video camera. In one embodiment, the at least one biometric recording device can be a video camera 26a as shown in FIG. 1, which can be capable of producing or extracting still images. In another embodiment, the at least one biometric recording device can include a video camera 26a and a fingerprint reader 26b as shown in FIG. 1

In one embodiment, the document scanning and comparison algorithm 30 can include an information document security and anti-counterfeiting database 32. Information document security and anti-counterfeiting database 32 can have security and anti-counterfeiting indicia which may be present on many different types of identification documents. Security and anti-counterfeiting indicia can include patterns, symbols or other indicia that are present in the visible and non-visible spectrum such as infrared and ultraviolet. The document scanning and comparison algorithm 30 can compare the security and anti-counterfeiting indicia captured from the identification document against database 32 to determine if the identification document is authentic and/or valid. In one embodiment the document scanning and comparison algorithm 30 and security and anti-counterfeiting indicia database 32 can be Assurtec's AssureID System.

The biometric data processing algorithm 27 can be dependent on the specific biometric data captured. In one embodiment, the biometric data processing algorithm can be face recognition software which analyzes and compares facial features of two or more sets of captured facial images. In one embodiment the face recognition software can be Neurotechnology's Verilook Face Recognition. For fingerprint analysis and comparison, the biometric data processing algorithm can be Neurotechnology's MegaMatcher SDK. For finger vein analysis and comparison, the biometric data processing algorithm can be Hitachi's Finger vein authentication. For palm vein analysis and comparison, the biometric data processing algorithm can be Fujitsu PalmSecure SDK.

In one embodiment, the data processing algorithm 28 controls the operation of the identity authentication apparatus as follows. A testing candidate can approach apparatus 10 and can be instructed by apparatus 10 to place an identification document on scanning device 20. The identification document can be a state issued driver's license or government issued passport among others. Apparatus 10 may automatically detect the placement of the identification document on the scanning device 20 and initiate scanning of the identification document or the test candidate may de directed to initiate the scan.

The scanning device 20 can capture identification document information such as textual information and biometric information such as a facial image and/or fingerprint pattern. In addition scanning device 20 can capture identification document information such as security or anti-counterfeiting indicia that may be present including any such indicia which may be detected in the non-visible spectrum such as infra-red or ultraviolet ranges. Textual information can include biographic and/or demographic information such as name, residential address, date of birth, hair color, eye color, among others and can be compared with a database 34 of persons qualified or registered to sit for the exam or other activity such as a training event.

The document scanning and comparison algorithm 30 can compare the security and anti-counterfeiting indicia captured by scanning device 20 from the identification document to the security and anti-counterfeiting database 32 to determine if the identification document is authentic and/or valid.

If the identification document is deemed valid and/or authentic, apparatus 10 can direct the test candidate to look directly at video camera 26a so that a digital image can be taken. After video camera 26a captures a facial image of the test candidate, the facial image is compared by the face recognition software 27 to the biometric data captured from the identification document by scanning device 20 to determine if the testing candidate is the person represented by the identification document. If the biometric data match, apparatus 10 can display and/or issue a confirmation code and/or information direct the testing candidate to a specified location to sit for the examination or other activity. In another embodiment the capturing of biometric data from the test candidate can be performed prior to the scanning of the identification document.

Figure 2:
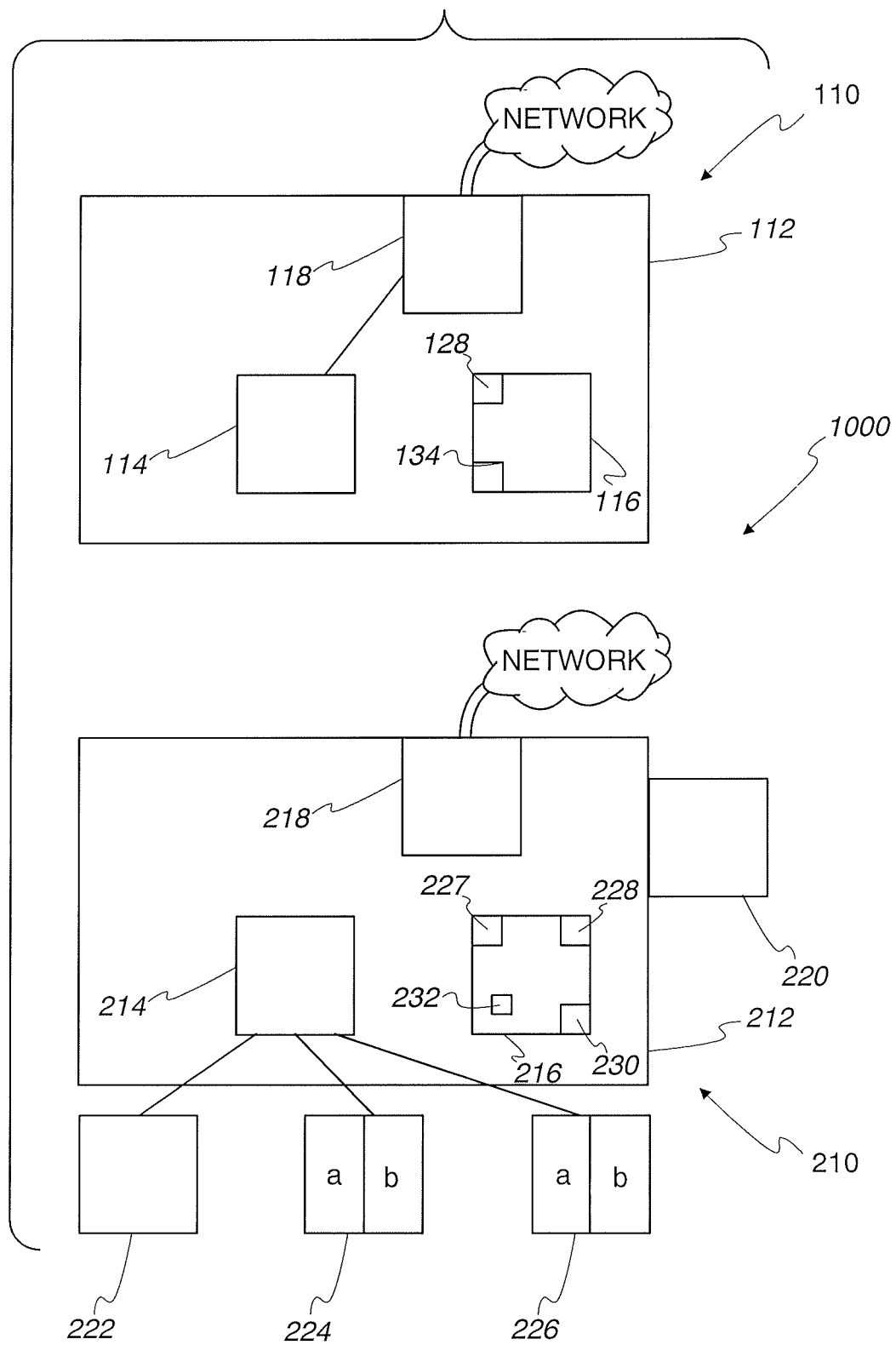
FIG. 2 shows a schematic view of a registration and admission system according to the present disclosure.

In another aspect of the present disclosure, FIG. 2 shows a system 1000 for registration and authentication of the identity of a test candidate. In one embodiment, system 1000 can include a first apparatus 110, which may be an administration station, for registering a test candidate and scheduling an event such as an exam or training event and a second apparatus 210, which may be an admission station, remotely positioned from the first apparatus 110 for capturing biometric data from a testing candidate. Remotely positioned can mean positioned as close as in at least different rooms in the same structure or building and as far away as opposite ends of the earth. The first and second apparatuses 110, 210 can communicate with each other through a network connection such as for example a LAN, WAN, or the internet or World Wide Web. The authentication of the identification document and authentication of test candidate's identity through comparison of biometric data captured from the identification document and from the test candidate can occur at either first apparatus 110 or second apparatus 210.

In one embodiment, first apparatus 110 shown in FIG. 2 can include a computing device 112 which can have a processor 114, a data storage device 116 operably connected to the data processor 114, a communication link 118 operably connected to the processor 114 for transmitting and receiving data over a network and a data processing algorithm 128 for controlling the operation of first apparatus 110.

Figure 3:
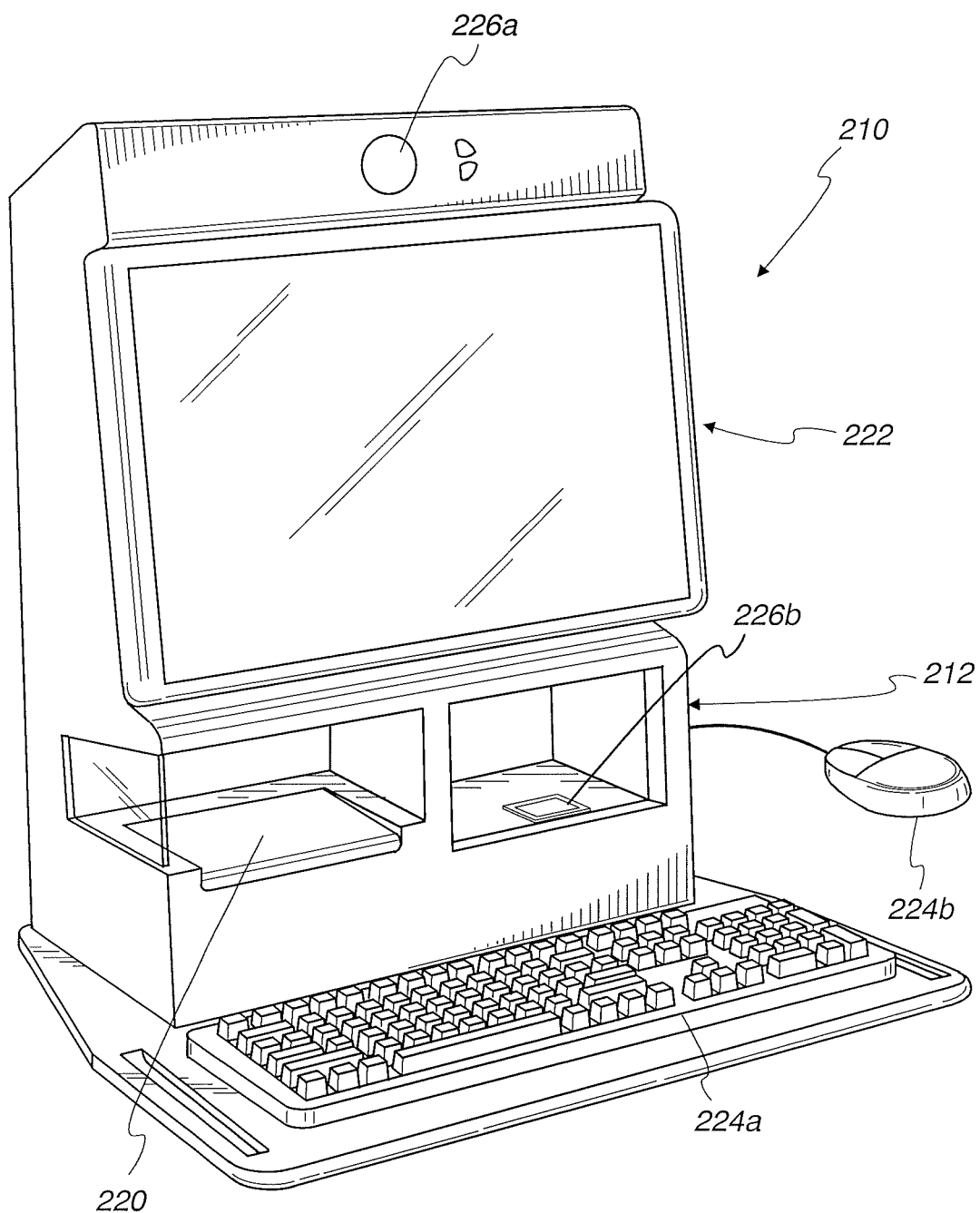
FIG. 3 shows a perspective view of one embodiment of an identification document and test candidate biometric data capture apparatus for validation and authentication of both according to the present disclosure.

Second apparatus 210 shown in FIGS. 2 and 3 can include a computing device 212 which can have a processor 214, a data storage device 216 operably connected to the data processor 214, a scanning device 220 operably connected to the data processor 214, a display 222 operably connected to the data processor 214, at least one input device 224 operably connected to the data processor 214, at least one biometric data recording device 226, a communication link 218 operably connected to the processor 114 for transmitting and receiving data over a network and a data processing algorithm 228 for controlling the operation of the second apparatus 210. In one embodiment, second apparatus 210 can be in the form of a kiosk or self contained unit as shown in FIG. 3.

First or second apparatus 110, 210 can include a document scanning and comparison algorithm, security and anti-counterfeiting database and a biometric data processing algorithm for comparing the identification document information captured by the scanning device 220 to the registration information, security and anti-counterfeiting database and biometric data captured from the test candidate to register and admit the test candidate during a registration and admission process described below.

In one embodiment first apparatus 110 can include document scanning and comparison algorithm, security and anti-counterfeiting database, and biometric data processing algorithm stored on the data storage device 116 to permit first apparatus 110 to conduct the comparison of captured identification document information for registering and admitting the test candidate during the registration and admission process described below.

In another embodiment second apparatus 210 can include document scanning and comparison algorithm 230, security and anti-counterfeiting database 232, and biometric data processing algorithm 227 stored on the data storage device 216 to permit second apparatus 210 to conduct the comparison of captured identification document information for admitting the test candidate during the admission process described below and first apparatus 110 can include comparison algorithm 130 for comparing textual information captured by scanning device 220 and communicated by apparatus 210 to the registration information.

In one embodiment, computing devices 112, 212 can each be a personal computer, particularly OptiPlex 780 Ultra Small Form Factor having an Intel® Core™ 2 Duo E7500 with VT (2.93 GHz, 3M, 1066 MHz FSB) for data processors 114, 214.

In one embodiment, data storage devices 116, 216 can each be solid state drives or hard disk drives such as Western Digital 1 TB hard drive. First and second apparatuses 110, 210 can each also include data storage such as random access memory for improving the operation of the data processor.

In one embodiment, scanning device 220 can be a digital document and/or card scanner. The scanning device 220 can capture identification information data typically found on identification documents such as passports driver's licenses, state issued identification cards, military identification cards. Identification document information can include textual information, biometric data such as an image of the face or of a fingerprint pattern of the authentic holder of the identification document and security and anti-counterfeit indicia. Textual information can include biographic and/or demographic information such as name, residential address, date of birth, hair color, and eye color, among others. In one embodiment scanning device 20 can have resolution, detection and capture capabilities to permit accurate capture of identification document data typically found on identification documents such as text having small font types, any biometric data such as a facial image, finger print, or retinal pattern, and security and anti-counterfeit indicia whether present in the visible spectrum or non-visible spectrum such as ultraviolet and infra red. In one embodiment, the scanning device 220 can be 3M AT 9000 Full Page Reader Scanner.

In one embodiment, display 222 can be a CRT or LED-type thin panel display. In one embodiment, display 222 can be a Dell E1909WDD. The at least one input device 224 can be a QWERTY-type keyboard 224a and mouse 224b as shown in FIG. 3 In one embodiment, the keyboard 224a and mouse 2224b can be a Dell USB Keyboard and Dell USB Optical Mouse. Alternatively, in another embodiment, the at least one input device can be included with the display in the form of a touch screen display or touch-enabled display such as Elo 1000 Series 1515L Touch Screen Monitor.

The at least one biometric recording device can be one or more of a palm print recording device, a palm vein pattern recording device, finger vein pattern recording device, an iris pattern recording device, a retinal pattern recording device, a fingerprint recording device, key stroke biometrics recording, signature capture writing pad, hand geometry scanning device, voice recording and facial image recording device such as digital camera or digital video camera. In one embodiment, the at least one biometric recording device can be a video camera 226a which can be capable of producing or extracting still images as shown in FIG. 3. In another embodiment, the at least one biometric recording device can include a video camera 226a and a fingerprint reader 226b as shown in FIG. 3

In one embodiment, the document scanning device 220 can capture extract the identification document information. In one embodiment, the document scanning and comparison algorithm 230 can include an information document security and anti-counterfeiting database 232. Information document security and anti-counterfeiting database 232 can have security and anti-counterfeiting indicia which may be present on many different types of identification documents. Security and anti-counterfeiting indicia can include patterns, symbols or other indicia that are present in the visible and non-visible spectrum such as infrared and ultraviolet. The document scanning and comparison algorithm 230 can compare the security and anti-counterfeiting indicia captured from the identification document against database 232 to determine if the identification document is authentic and/or valid. In one embodiment the document scanning and comparison algorithm 230 and security and anti-counterfeiting indicia database 232 can be Assurtec's AssureID System.

The biometric data processing algorithm 227 can be dependent on the specific biometric data captured. In one embodiment, the biometric data processing algorithm can be face recognition software which analyzes and compares facial features of two or more sets of captured facial images. In one embodiment the face recognition software can be Neurotechnology's Verilook Face Recognition. For fingerprint analysis and comparison the biometric data processing algorithm can be Neurotechnology's MegaMatcher SDK. For finger vein analysis and comparison the biometric data processing algorithm can be Hitachi's Finger vein authentication. For palm vein analysis and comparison the biometric data processing algorithm can be Fujitsu PalmSecure SDK In one embodiment, the communication links 118, 218 can provide network connection using a variety of protocols such as TCP/IP and can connect to different types of networks such as LAN and WAN and specifically the internet and/or world wide web. In one embodiment communication links 118, 218 can be a 1510 mini PCIe WLAN card.

Operation of system 1000 as controlled by operation data processing algorithms 128, 228 is described as follows. In one embodiment, a test candidate can first register for an event or test. Registration can be performed using any web enabled or connected computer such as home computer or even apparatus 210. Test candidate can access the registration system via a webpage communicating with apparatus 110. At a welcome screen, the candidate can select the exam or other event requiring registration. A request can be made for the test candidate to enter registration information such as personal information or login credentials if an account already exists with the registration authority. Personal information such as address, date of birth among other information may be requested depending on the particular event or test. In one embodiment, the registration information requested and collected can include information that would be common to several different types of identification documents such as name and birth date.

Apparatus 110 can check this personal information against database 134 stored locally on storage device 116 to determine if the candidate is qualified to sit for the test or event such as by matching the candidate-entered registration information such as personal demographic/biographic information to the information in the database. Alternatively, apparatus 110 can access a database of the third party testing authority or institution responsible for the event or examination to determine whether the test candidate is qualified for the exam. In yet another embodiment, upon entry of the candidate's name, the apparatus can check the local database 134 or responsible institution's database without the candidate having to select the event before hand.

If the candidate is qualified, the candidate can be requested to pay for the event by entering credit or debit card or wire transfer information, if required. Apparatus 110 can issue a confirmation code and/or other such as information directing the candidate where to proceed for admission and identity authentication which may be needed to participate in an event or sit for an exam and what identification document may be needed. If the candidate is not qualified, the candidate can be notified and the webpage can return to the welcome screen.

In another embodiment of a registration process, a request can be made for log in credentials for a third party account or institution such as Open-ID, OAUTH.net, FACEBOOK, TWITTER, a financial institution, government agency or candidate's employer, before or after selecting the exam or other event requiring registration. Apparatus 110 can forward the log in credential to the third party account and can request registration information such as personal demographic/biographic information such as the name associated with the log in credentials. The candidate can authorize the third party account to provide personal information to apparatus 110. Additional registration information such as address, date of birth among other information may be requested in addition to the information provided by the third party account or institution.

Apparatus 110 can check this personal information against database 134 stored locally on storage device 116 to determine if the candidate is qualified to sit for the test or event such as by matching the registration information to the information in database 134. Alternatively, apparatus 110 can access a database of the third party institution responsible for the event or examination to determine whether the test candidate is qualified for the exam. Alternatively, upon entry of the candidate's name, the apparatus can check the local or responsible institution's database without the candidate having to select the event before hand. If more than one dates and locations for the event or test are available, candidate can choose which to attend.

Figure 3A:
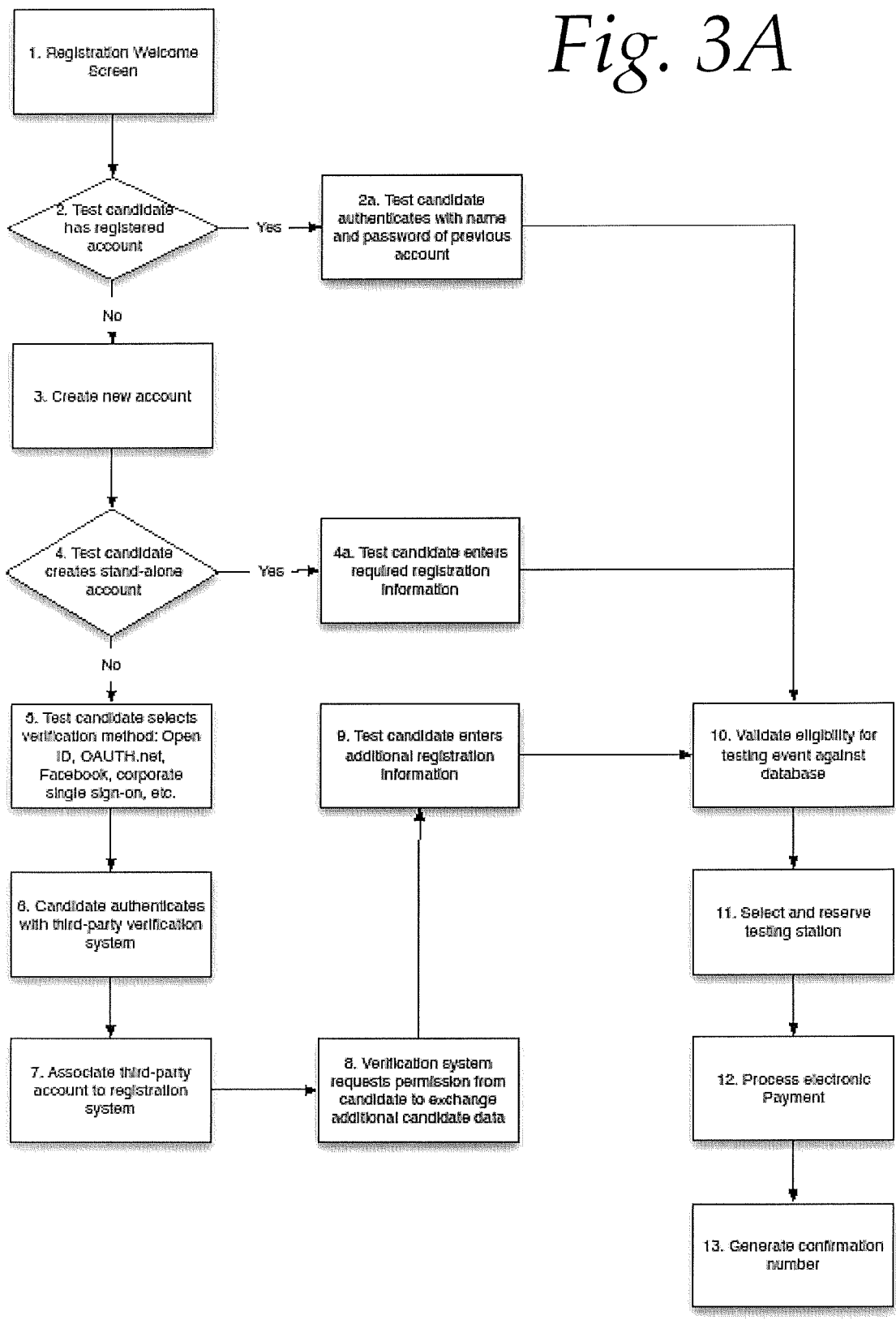
FIG. 3A shows one embodiment of a registration process according to the present disclosure.

If the candidate is qualified, the candidate can be requested to pay for the event by entering credit or debit card or wire transfer information, if required. Apparatus 110 can issue a confirmation code and/or other information such the location of the admission process and testing event and identifying the particular apparatus or apparatuses conducting the admission process and/or testing event. The information can also include what identification document may be required for the admission process. If the candidate is not qualified, the candidate can be notified and the webpage can return to the welcome screen. One embodiment of a registration process is shown in FIG. 3A Following the registration process, test candidate can go to apparatus 210 to perform an admission process. The admission process can determine the authenticity and validity of the candidate's identification document and can authenticate the identity of the candidate via comparison of biometric data captured from the identification document and biometric data captured from the test candidate. In one embodiment, the admission process can follow the process outlined in FIG. 4. In one embodiment, a welcome screen such as shown in FIG. 5 can greet the test candidate and can provide details as to the identification of apparatus 210 as a "station number" and the address which can be included on the information provided by apparatus 110 following registration. Test candidate can select "Next" to proceed.

The candidate can then be presented with a "Find Reservation" screen such as shown in FIG. 6 prompting the candidate to enter either the confirmation code provided by apparatus 110 following registration or other information to determine if the test candidate has been registered to proceed with the event or exam. Once the confirmation code or other information is entered, apparatus 210 can communicate with apparatus 110 to verify that code or information is valid and that the test candidate can proceed. If the code or information is not found, the candidate is prevented from proceeding with the next step and can instead be returned to reenter the code or information. If the reservation is found, first apparatus 110 can communicate details of the reservation to apparatus 210. A "Reservation Confirmation" screen such as shown in FIG. 7 can be displayed by apparatus 210 providing information such as the name of the test candidate, the sponsor or testing authority, the name of the event or exam, time and length of the event.

The next step can be either the scanning of the test candidate's identification document information or capturing biometric data from the test candidate. Also depending on the requirements of the particular event or exam, scanning of an identification document may not be required. For example, in one embodiment, the event may be a training exercise or an employer sponsored test, in which the employer or other testing authority may only require corporate or employer account log-in credentials and biometric data such as image of the test candidate's face or facial image to be captured and included in a final report at the conclusion of the event. The employer or other testing authority may have knowledge of the appearance of the particular biometric data of the test candidate such as the facial appearance of the candidate and can authenticate the candidate by visually inspecting the facial image when reviewing the final report accompanying the results of the event without requiring the captured facial image of the candidate to be compared with facial image from an identification document. In another embodiment, neither scanning of an identification document or capture of biometric data from a test candidate may be required.

Figure 4:
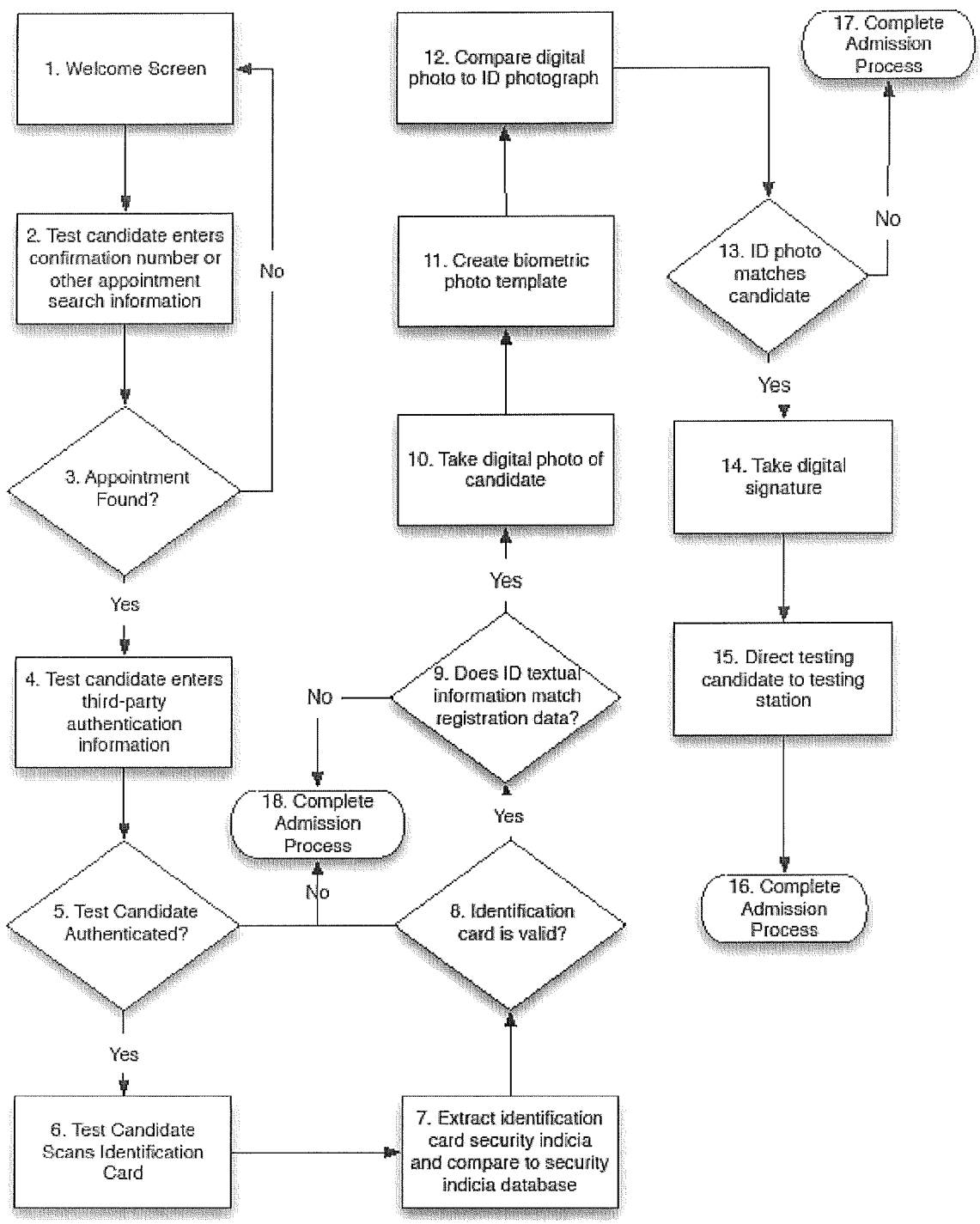
FIG. 4 shows one embodiment of an admission process according to the present disclosure.
Figure 8:
FIG. 8 shows one embodiment of a screen shot of still another step of the admission process according to the present disclosure.
Figure 9:
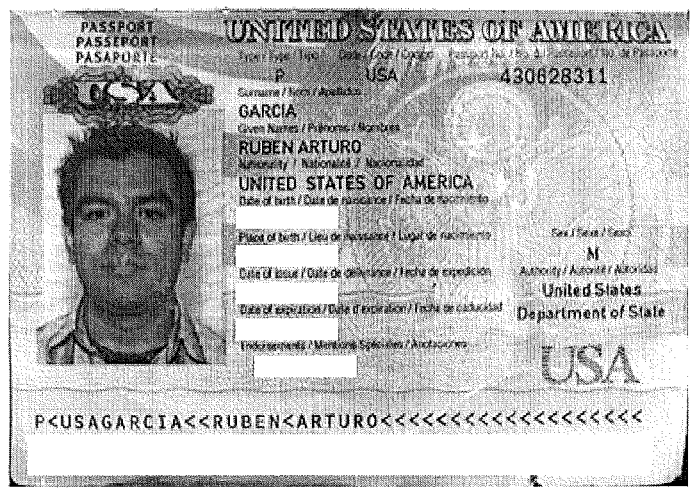
FIG. 9 shows one embodiment of a screen shot of another step of the admission process according to the present disclosure.

In one embodiment, both scanning of an identification document and the capture of biometric data from a test candidate may be required and can be performed in any order. In one embodiment, capture of biometric data from the identification document is performed prior to capture of biometric data from test candidate as shown in FIG. 4. Accordingly, in one embodiment, a screen such as "Scan ID" shown in FIG. 8 can be displayed to the test candidate requesting that the candidate place an identification document on scanning device 220 and can provide an illustration of the act. The scanning device 220 can capture the identification document information and ID security and anti-counterfeiting database and algorithm 232 can extract data including textual information, biometric information such as a facial image or fingerprint pattern depending on the particular identification document and security and/or anti-counterfeit indicia that may be present. In one embodiment, apparatus 210 can display the scan of the identification documents as shown in FIG. 9.

Figure 10:
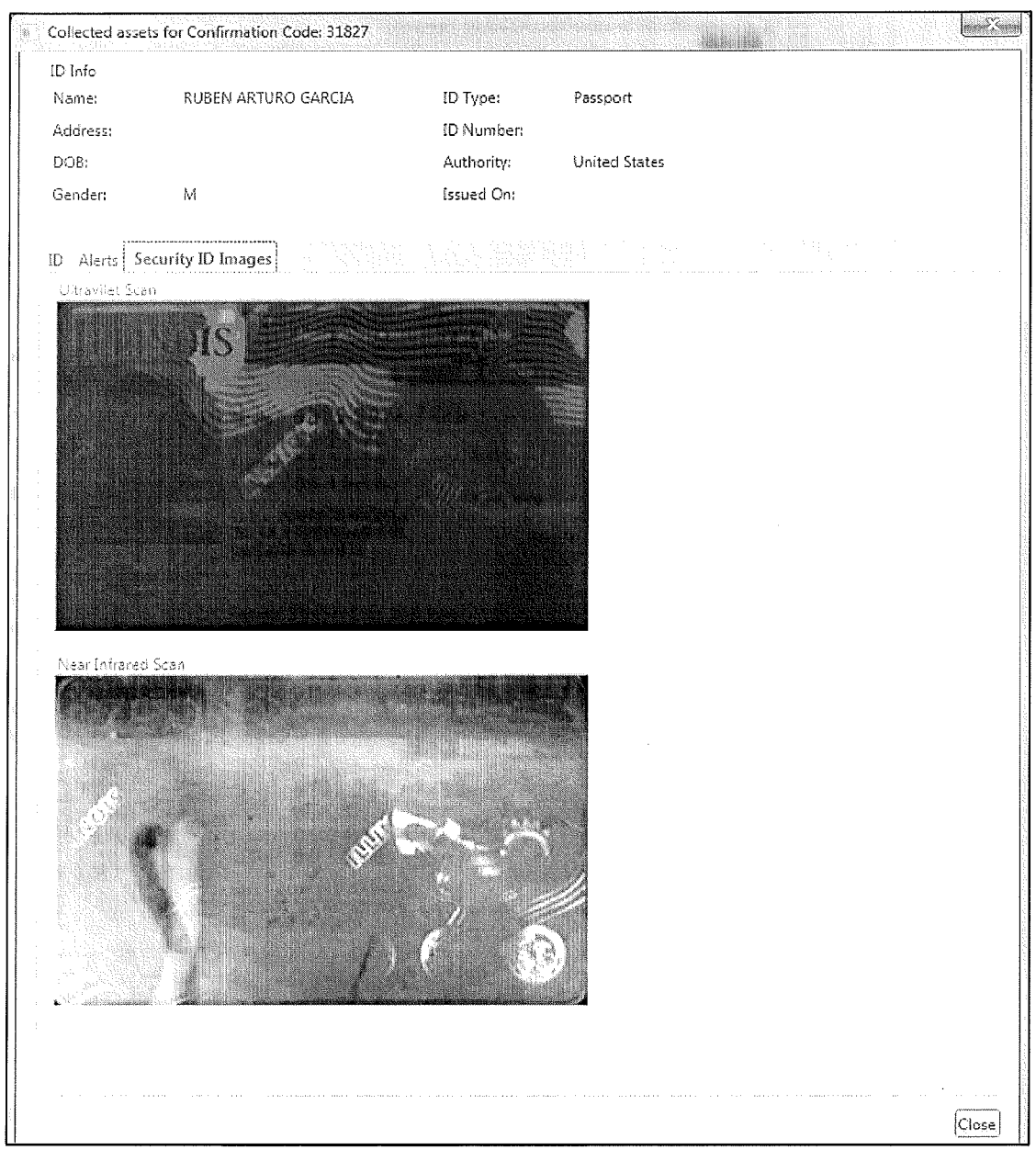
FIG. 10 shows one embodiment of the near infrared and ultraviolet security and anti-counterfeit indicia captured and examined by one embodiment of an apparatus according to present disclosure.

In one embodiment, the security and anti-counterfeit indicia examined can include indicia present in the visible, ultraviolet and near infrared spectra as shown by the screen shots in FIGS. 10 and 11. The document scanning and comparison algorithm 230 can compare the security and anti-counterfeiting indicia captured from the identification document to the database 232 to determine if the identification document is authentic and/or valid, and the textual information extracted from the identification document can be compared to registration information communicated to apparatus 210 by apparatus 110 to determine if they match. This information may or may not be presented to the candidate. Alternatively, the identification document information captured from the identification document can be communicated to apparatus 110 for comparison by apparatus 110 to determine if they match. It is understood that in such cases apparatus 110 can include the document scanning and comparison algorithm and the security and anti-counterfeiting database.

If the relevant extracted identification document information do not match the registration information and the security or anti-counterfeit indicia do not match the expected indicia of database 232, the admission process can be terminated and the test candidate can be informed of the same. In another embodiment, the candidate can be instructed to scan a different identification document or else the admission process can be terminated. If there is a match between the security and anti-counterfeiting indicia extracted from the identification document and the indicia of database 232 and the textual information extracted from the identification information document match the registration information then the identification document can be deemed valid and authentic and candidate registration data is deemed valid. The test candidate can proceed to the biometric data capture step. The test candidate can proceed to the next portion of the admission process which can include capture of biometric data from the test candidate. (IS THIS CORRECT)

The biometric data captured from the test candidate can depend on the biometric data present on the identification document. Typically, many identification documents include a facial image. Some identification documents may include more than one set of biometric data such as a facial image and one or more fingerprint patterns. In such cases, selection of which one or more biometric data to capture from the test candidate for comparison with one more biometric data appearing on one more identification documents can be determined by each testing or event planning authority to satisfy identity authentication of the candidate. In one embodiment, the biometric data from one identification document is captured to be compared with the analogous biometric data from the test candidate. In one embodiment, a facial image is captured from the identification document and a facial image is captured from the test candidate for comparison to authenticate the test candidate.

Figure 12:
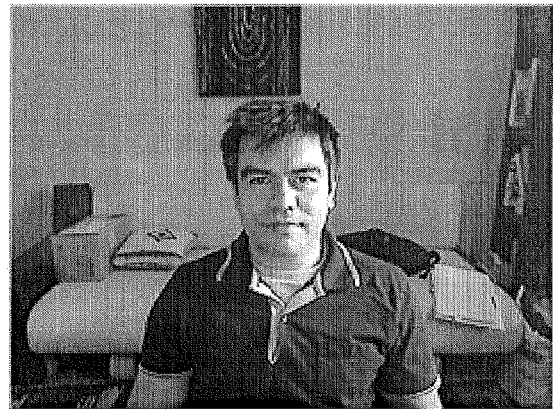
FIG. 12 shows one embodiment of a screen shot of another step of the admission process according to the present disclosure.

In one embodiment, apparatus 210 can display a "Take Photo" screen as shown in FIG. 12 instructing that a photo can be captured by clicking of the "Take Photo" button. Apparatus 210 can display the video feed of video camera 226a so as to permit the candidate to align and pose for the photo. The image or photo taken of the test candidate can be compared against the image captured from the identification document by face recognition software 227. Alternatively, the face recognition or other biometric data processing algorithm can reside with apparatus 110 and the relevant biometric data captured by apparatus 210 can be communicated to apparatus 110 for comparison by apparatus 110. If the biometric data match test candidate can be instructed to proceed to a testing station for presentation of the event or test. In one embodiment the test candidate is directed to proceed to a specified testing station. This can complete the admission process. In one embodiment, a digital signature can be requested and captured by digital writing pad to complete the admission process.

In another embodiment, apparatus 210 can request to capture an additional form of biometric data from the test candidate. This additional capture of biometric data can also be authenticated against the same type of biometric data appearing on the identification document or stored for comparisons at other stages of the admission process or testing process. In one embodiment the additional biometric data can be used in subsequent comparisons of biometric data to revalidate the identity of the candidate who successfully authenticated their identity through the admission process. In one embodiment, testing candidate is requested to scan a particular finger using fingerprint reader 226b to capture a fingerprint pattern.

Figure 13:
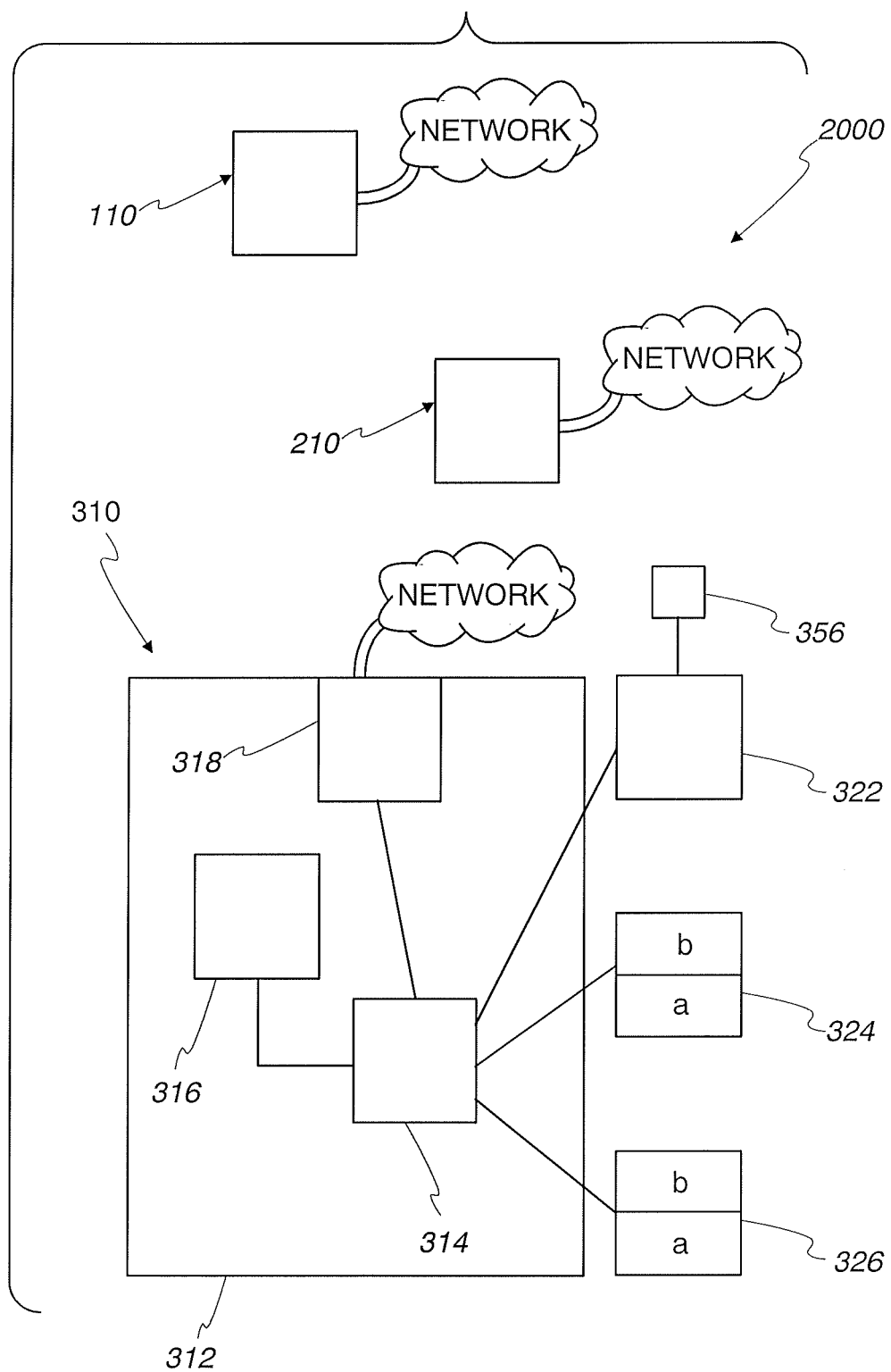
FIG. 13 shows a schematic view of one embodiment of a testing apparatus according to the present disclosure.

In another aspect of the present disclosure, a registration, admission and testing system is provided. In one embodiment, system 2000 can include first apparatus 110, second apparatus 210 of system 1000, and a third apparatus 310 all connected over a network as shown in FIG. 13. In one embodiment, apparatus 110 can be a central administration station remotely located from second apparatus 210 which can be referred to as an admission station, and third apparatus 310 which can be referred to as a testing station. In another embodiment apparatus 210 can also be remotely located from apparatus 310. As described above, remotely located can mean positioned as near as at least in separate rooms of a building or other structure to as far as opposite ends of the earth. System 2000 can include any number of first, second and third apparatus 110, 210, 310. In one embodiment, there can be multiple third apparatus 310 for each first and second apparatuses 110, 210.

In one embodiment, third apparatus 310 can include a computing device 312 which can have a processor 314, a data storage device 316 operably connected to the data processor 314, a communication link 318 operably connected to the processor 314 for transmitting and receiving data over a network, a display 322 operably connected to the data processor 314, at least one input device 324 operably connected to the data processor 314, at least one biometric data recording device 326, and a data processing algorithm 328 for controlling the operation the third apparatus 310. Apparatus 310 can also include a privacy filter 356 mounted to display 322 to limit the viewing angle of the display 322.

In one embodiment, computing devices 312 can be a personal computer, particularly OptiPlex 780 Ultra Small Form Factor having an Intel® Core™ 2 Duo E7500 with VT (2.93 GHz, 3M, 1066 MHz FSB) for data processors 314.

In one embodiment, data storage devices 316 can be solid state drives or hard disk drives such as Western Digital 1 TB hard drive. Third apparatus 310 can also include data storage such as random access memory for improving the operation of the data processor.

In one embodiment display 322 can be a CRT or LED-type thin panel display. In one embodiment, display 322 can be a Dell E1909WDD. In one embodiment, privacy filter 356 can allow only persons directly in front or angled no more than 20 degrees from directly in front the display to see the image on screen and preferably on more than 10 degrees from directly in front of the display. In one embodiment, privacy filter 356 can be 3M privacy filter. The at least one input device 324 can be a QWERTY-type keyboard 324a and mouse 324b In one embodiment, the keyboard 324a and mouse 3224b can be a Dell USB Keyboard and Dell USB Optical Mouse. Alternatively, in another embodiment, the at least one input device can be included with the display 320 in the form of a touch screen display or touch-enabled display such as Elo 1000 Series 1515L Touch Screen Monitor.

The at least one biometric recording device can be one or more of a palm print recording device, a palm vein pattern recording device, finger vein pattern recording device, an iris pattern recording device, a retinal pattern recording device, a fingerprint recording device, key stroke biometrics recording, signature capture writing pad, hand geometry scanning device, voice recording device and facial image recording device such as digital camera or digital video camera. In one embodiment, the at least one biometric recording device can be a video camera 326a which can be capable of producing or extracting still images. In another embodiment, the at least one biometric recording device can include a video camera 326a and a fingerprint reader 326b. In one embodiment the video camera 326a can be a high definition web video camera such as Logitech QuickCam Pro 9000 and the fingerprint reader can be Upek fingerprint reader In one embodiment, the communication link 318 can provide network connection using a variety of protocols such as TCP/IP and connect to different types of networks such as LAN and WAN and specifically the internet and/or World Wide Web. In one embodiment communication link 318 can be a 1510 mini PCIe WLAN card.

First apparatus 110 can receive registration information from a test candidate, apparatus 210 can capture identification document information from one or more identification documents and biometric data from the test candidate, and the third apparatus 310 can capture biometric data from the test candidate and can present an event such as an exam or a training event. As described above data from the identification document can include textual information such as personal, demographic and/or biographic information; biometric information such as a facial image or photograph, one or more fingerprint patterns among others; and security or anti-counterfeit indicia whether present in the visible spectra or non-visible portions of the spectrum such as ultraviolent or infrared spectra. Comparisons of any one of the data captured from the identification document against any one of test candidate provided registration data, database of security and anti-counterfeit indicia and biometric data captured from the test candidate can be performed by any one or more of first apparatus, second apparatus and third apparatus and in any combination by communicating the relevant data and information to the relevant apparatus.

In one embodiment, apparatus 110 can have a biometric data processing algorithm and can conduct the comparison of biometric data taken from the identification document and the test candidate. Apparatus 110 can include a document scanning and comparison algorithm and information document security and anti-counterfeiting database and can conduct the comparison of security and anti-counterfeiting indicia from the identification document against the database of security and anti-counterfeiting indicia. Also, apparatus 110 can conduct the comparison of registration information against the personal, demographic and/or biographic information taken from the identification document. For example, textual information from the identification document such as personal, demographic and/or biographic information can be compared against test candidate entered or provided registration information by first apparatus 110 by having apparatus 210 communicate any relevant data or information taken from the identification document to apparatus 110.

In one embodiment, first apparatus 110 and second apparatus 210 can be configured and can perform a registration and admission process as described above with respect to system 1000. As shown in FIG. 4 and as described above with respect to system 1000, the registration and admission process ends by directing the testing candidate to a testing station. In one embodiment the third apparatus 310 can be the testing station.

In one embodiment, if there are more than one testing stations 310, apparatus 210 can identify the testing station by providing a unique identification number assigned to each testing station. In another embodiment, upon completion of the admission process during which the testing candidate's identification documents have been validated and authenticated and the test candidate's identity has been authenticated, apparatus 210 can provide testing candidate with a unique testing station identification code and confirmation code. Testing candidate can proceed to third apparatus 310 and enter the confirmation code to begin the testing process. Third apparatus 310 can communicate with second apparatus 210 to determine if the confirmation code is valid. Alternatively, third apparatus 310 can communicate with apparatus 110 which received information concerning the confirmation code from apparatus 210 to determine whether the confirmation code is valid.

Upon approval of the confirmation code, testing station can conduct an identity authentication of the test candidate to ensure the test candidate that went through the admission process is the test candidate sitting for the exam at third apparatus 310 by requesting that biometric data be captured. In one embodiment, video camera 326a can take a digital image of the candidate's face as described above in relation to step 10 of the admission process shown in FIG. 4 and screen shot shown in FIG. 12. In another embodiment, third apparatus 310 captures a fingerprint pattern for comparison by the second apparatus to the fingerprint pattern captured from the testing candidate during the admission process. The biometric data, such as the facial image captured by camera 326a or the fingerprint captured by fingerprint reader 326b, can be compared to biometric data taken from the identification document or the biometric date taken of the testing candidate during the admission process, such as the facial image or fingerprint pattern, by either apparatus 110, 210 or 310 by having the biometric data communicated to the apparatus performing the comparison. In one embodiment, the second apparatus 210 can perform the comparison of the facial image captured by camera 326a and communicated to second apparatus 210 via the network connection to the facial image captured from the identification document using face recognition software 227. In another embodiment the second apparatus 210 can perform the comparison of the fingerprint pattern captured by fingerprint reader 326b and communicated to second apparatus 210 via the network connection to the fingerprint pattern captured from the test candidate during the admission process using biometric data processing algorithm 227.

If the biometric data match, testing station can begin the exam. If the biometric data do not match the test candidate may be permitted to try to authenticate again or the testing process can be terminated. In one embodiment, the test candidate can be allow to resubmit to biometric data capture by biometric recording device 326 and comparison by processing algorithm 227 one additional time before termination of the admission process. In another embodiment, if the biometric data match, a digital signature can be requested and captured by digital writing pad to complete the admission process.

In one embodiment one or more on-site proctors can monitor the testing process for cheating or unauthorized copying of exam materials. In another embodiment the on-site proctor may intervene if the authentication of the candidate fails and override the testing station to permit the test candidate to sit for the exam by conducted their identity authentication such as by comparing the test candidate to the biometric data on the identification document.

The exam can be stored on any of first second or third apparatuses 110, 210, 310 or even stored by a third party testing authority. If the exam is stored anywhere other than the third apparatus 310, the third apparatus can communicate with the other apparatuses 110, 210 or third party testing authority to transmit the exam to the third apparatus 310. In one embodiment, the exam can be stored by the third party testing authority and is transmitted or streamed to the third apparatus. As the test candidate answers question, the answers can be transmitted or streamed back to the testing authority in real time or can be stored locally and then or transmitted to one of the other apparatuses or the third party testing authority. In one embodiment, the answers can be transmitted in real time to the testing authority. Timing of the test such as time permitted per question or per section can be establish by the testing authority and managed by apparatus 310 or by the testing authority through control of the streaming process.

During the testing process, the testing candidate may need to request a pause in the exam such as for restroom breaks. The third apparatus 310 can include a pause button or other way to pause the exam with or without intervention of the on-site proctor. In one embodiment a pause button link can appear along with the displayed exam which can be accessed by the testing candidate without intervention of a proctor. In one embodiment initiation of the pause feature pauses the exam and either obscures or blackens the display screen or jumps to a pause screen to avoid allowing the testing candidate from studying the particular question being displayed at the time of the pause for longer that the permitted time.

In one embodiment, in order to resume the exam, candidate accesses a resume button or link. The third apparatus can then request identity authentication. In one embodiment, third apparatus can capture biometric data such as facial image or fingerprint pattern for comparison by either of the apparatuses as discussed above. Once testing candidate's identity has been re-authenticated the exam can be allowed to resume. At the end of the exam, third apparatus can provide a report of the exam process. The report can include test results, digital signature, the number pause, the time the pauses occurred, biometric data captured from the identification document and or the testing candidate taken at point during the admission or testing process. In one embodiment, the report can also include the facial image of the test candidate taken during the admission process, the testing process and after any pauses.

Figure 14:
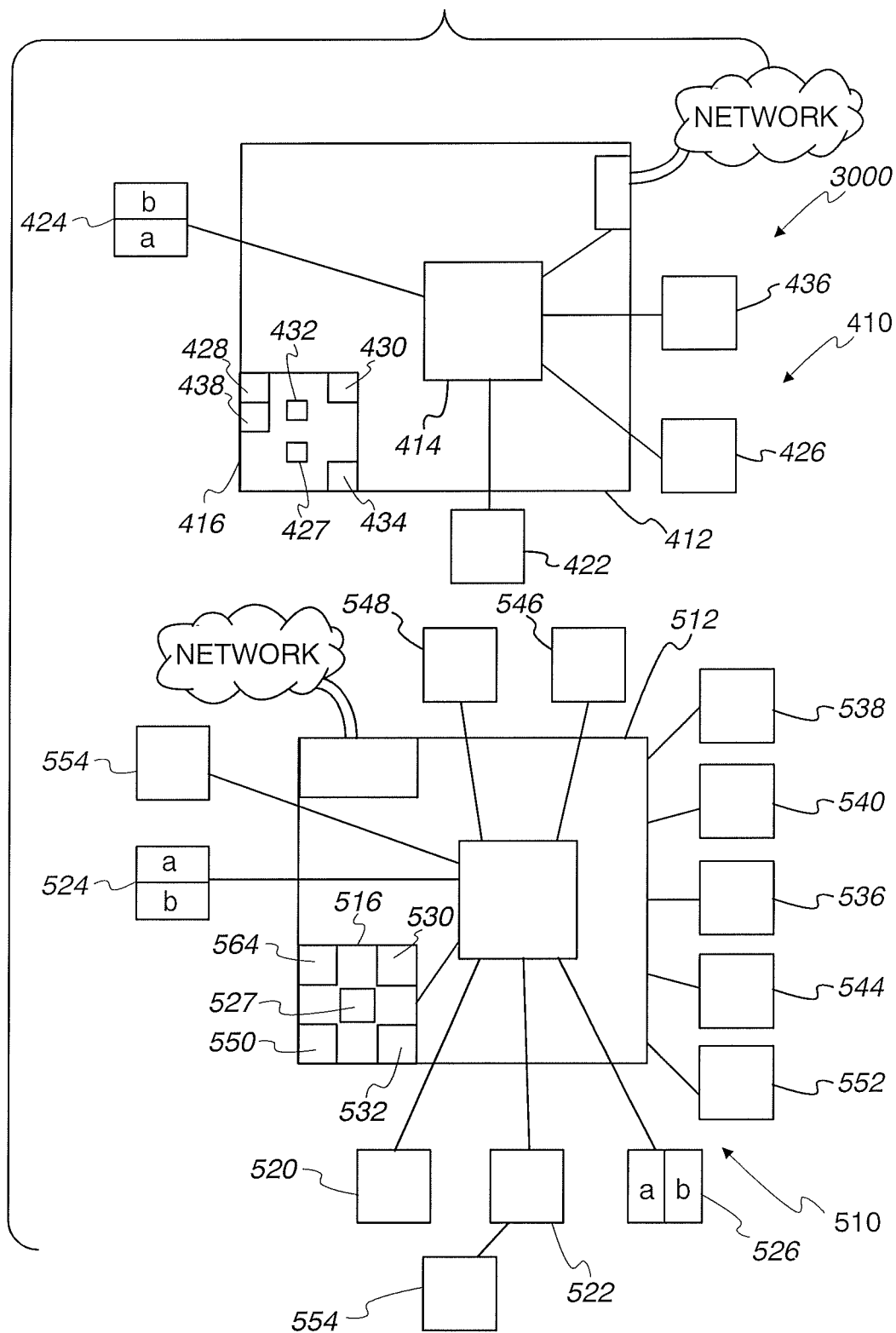
FIG. 14 shows a schematic view of one embodiment of a registration, admission, and testing system for remote proctoring of an exam.

In another aspect of the present disclosure, a system can be provided for registering, admitting, and testing a candidate and remotely proctoring the exam or event. In one embodiment, system 3000 can include first apparatus 410 and second apparatus 510 connected to each other over a network as shown in FIG. 14. In one embodiment, first apparatus 410 can be referred to as a central administration station and can be remotely located from second apparatus 510 which can be referred to as an admission and testing station. As described above, remotely located can mean positioned as near as in at least separate rooms of a building or other structure or as far as opposite ends of the earth.

In one embodiment, first apparatus 410 can receive registration information from one or more test candidates, schedule tests or testing events and allow remote monitoring and proctoring by automated processes or by a human proctor of the tests or testing events occurring on one or more apparatuses 510. Second apparatus 510 can determine the valid and authenticity of a test candidate's identification document, authenticate the identity of the test candidate, record or capture the testing event, allow live monitoring of the testing event by the remote proctor and allow two way communication by the test candidate and proctor. In another embodiment, second apparatus 510 can capture identification document information which can include textual information, biometric such as a facial image and/or fingerprint pattern and security and anti-counterfeiting indicia and communicate the same for comparison by data processing algorithms and databases on the first apparatus 410 and/or by comparison by the human proctor at the second first apparatus 410.

System 3000 can include any number of first and second apparatuses 410, 510. In one embodiment, there can be multiple second apparatuses 510 for each first apparatus 410. In one embodiment, there can be from 1 to about 20 second apparatuses for each first apparatus 410. In another embodiment, there can be from about 5 to about 15 second apparatuses for each first apparatus 410.

Figure 15:
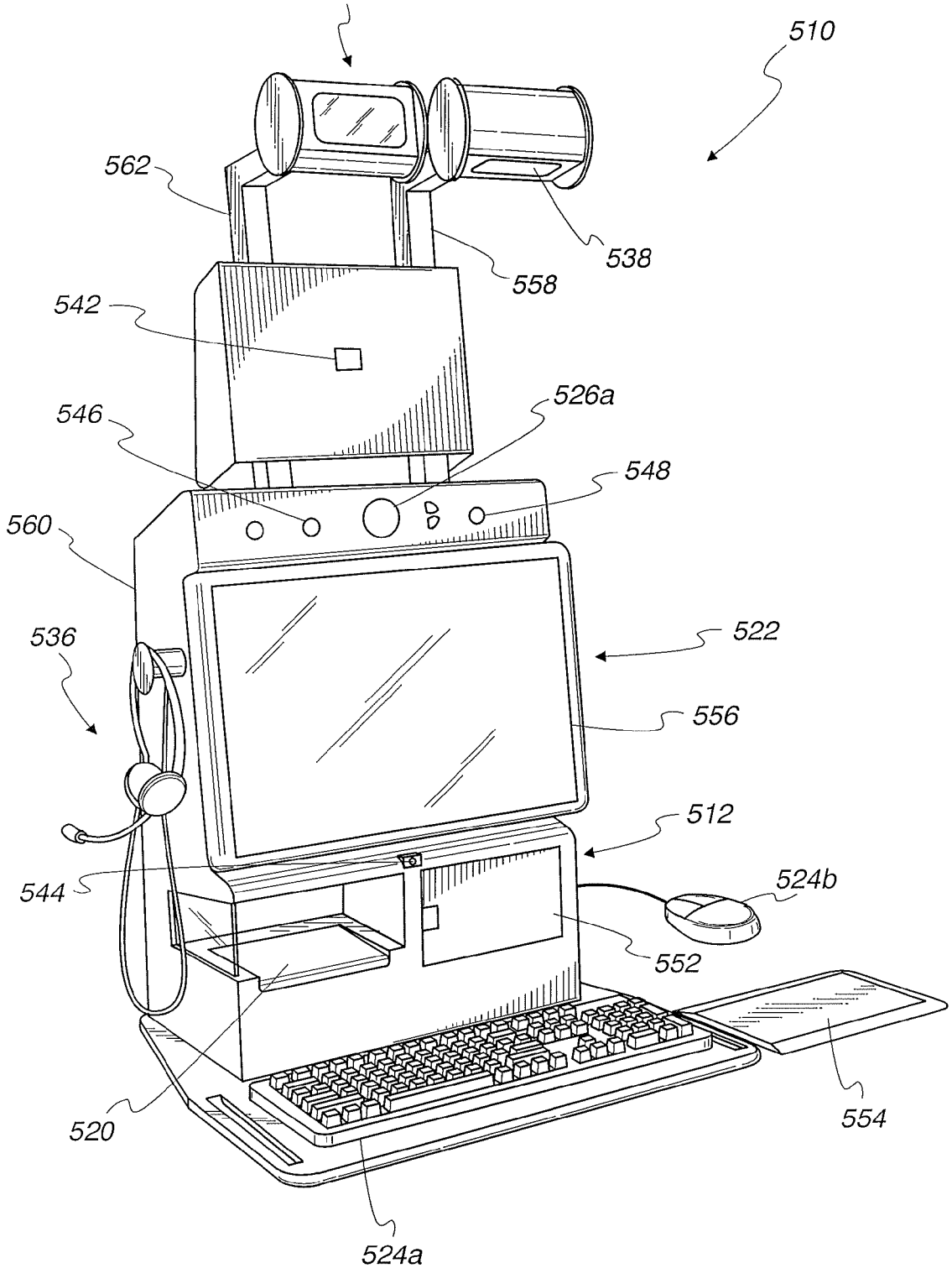
FIG. 15 shows a perspective view of one embodiment of an identification document information capture, test candidate biometric data capture and remote testing apparatus according to the present disclosure.

With reference to FIGS. 14 and 15, in one embodiment first apparatus 410 can include a computing device 412 which can have a processor 414, a data storage device 416 operably connected to the data processor 414, a communication link 418 operably connected to the processor 414 for transmitting and receiving data over a network, at least one display 422 operably connected to the data processor 414, at least one input device 424 operably connected to the data processor 414, and a data processing algorithm 428 for controlling the operation of the first apparatus 410. In another embodiment, apparatus 410 can include audio, video and/or text communication capabilities for communicating with the one or more test candidates.

In another embodiment, first apparatus 410 can also have an audio input and output device 436 operably connected to the data processor 414, a video camera 426 operably connected to data processor 414 and a real time communication algorithm 438 stored on the data storage device 416 for allowing audio, video communication and text chatting. In one embodiment audio input and output device 436 can be a headset having a pair of headphones and a microphone such as Logitech ClearChat Pro USB and video camera 426 Logitech's QuickCam Pro 9000 in another embodiment, the video camera 426 can include a microphone and one or more speakers can be operably connected to the data processor 414.

In one embodiment, second apparatus 510 can include a computing device 512 which can have a processor 514, a data storage device 516 operably connected to the data processor 514, a scanning device 520 operably connected to the data processor 514 for scanning identification documents, a display 522 operably connected to the data processor 514, at least one input device 524 operably connected to the data processor 514 for receiving allowing test candidate to interact with apparatus 510, at least one biometric data recording device 526 for capturing biometric data from the testing candidate, a communication link 518 operably connected to the processor 514 for transmitting and receiving data over a network, an overhead mounted digital still or video camera 538 for viewing and/or recording a downward view of the test candidate and surrounding environment, a second forward facing digital still or video camera 540 for viewing and or recording a view of the area surround the test candidate such as to the rear and sides of the test candidate, a rear facing digital still or video camera 542 for viewing and/or recording the area behind the second apparatus 510, at least one microphone 544 for detecting and/or recording sounds in the vicinity of the test candidate and a data processing algorithm 528 for controlling the operation of the second apparatus 510. In one embodiment, second apparatus 510 can be in the form of a kiosk or self contained, unified or integrally combined unit as shown in FIG. 15.

First or second apparatus 410, 510 can include a document scanning and comparison algorithm, security and anti-counterfeiting database and a biometric data processing algorithm for comparing the identification document information captured by the scanning device 520 to the registration information, security and anti-counterfeiting database and biometric data captured from the test candidate to register and admit the test candidate during a registration and admission process described below.

In one embodiment, the document scanning and comparison algorithm 430, 530 can include an information document security and anti-counterfeiting database 432, 532. Information document security and anti-counterfeiting database 432, 532 can have security and anti-counterfeiting indicia which may be present on many different types of identification documents. Security and anti-counterfeiting indicia can include patterns, symbols or other indicia that are present in the visible and non-visible spectrum such as infrared and ultraviolet. The document scanning and comparison algorithm 530 can compare the security and anti-counterfeiting indicia captured from the identification document against database 432, 532 to determine if the identification document is authentic and/or valid. In one embodiment the document scanning and comparison algorithm 430, 530 and security and anti-counterfeiting indicia database 432, 532 can be Assurtec's AssureID System.

The biometric data processing algorithm 427, 527 can be dependent on the specific biometric data captured. In one embodiment, the biometric data processing algorithm can be face recognition software which analyzes and compares facial features of two or more sets of captured facial images. In one embodiment the face recognition software can be Neurotechnology's Verilook Face Recognition. For fingerprint analysis and comparison, the biometric data processing algorithm can be Neurotechnology's MegaMatcher SDK. For finger vein analysis and comparison, the biometric data processing algorithm can be Hitachi's Finger vein authentication. For palm vein analysis and comparison, the biometric data processing algorithm can be Fujitsu PalmSecure SDK.

In one embodiment first apparatus 410 can include document scanning and comparison algorithm 430, security and anti-counterfeiting database 432, and biometric data processing algorithm 427 stored on the data storage device 416 to permit first apparatus 410 to conduct the comparison of captured identification document information to the candidate entered and/or third-party-account-provided registration information, security and anti-counterfeiting indicia database 432 and biometric data captured from test candidate for registering and admitting the test candidate during the registration and admission process described below.

In another embodiment, second apparatus 510 can include document scanning and comparison algorithm 530, security and anti-counterfeiting database 532, and biometric data processing algorithm 527 stored on the data storage device 516 to permit second apparatus 510 to conduct the comparison of captured identification document information to biometric data captured from test candidate for admitting the test candidate during the admission process described below, and first apparatus 410 can include comparison algorithm 430 for comparing textual information of the identification document captured by scanning device 520 and communicated by apparatus 510 to apparatus 410 to the candidate-entered and/or third-party account provided registration information.

In yet another embodiment, second apparatus 510 can also include one or more of an anti-copy system 546 for preventing the unauthorized copying or recording of the test or test materials, a CCD or CMOS detection system 548 for detecting the presence of CCD and CMOS devices of digital cameras, an object cataloging algorithm 550 stored on the data storage device 516 for detecting unauthorized objects such as mobile communication devices, cameras, and/or or other recording or listening devices or persons in the surrounding environment of the test candidate, a lockable storage compartment 552, a digital writing pad 554 for capturing and displaying notes on the display 522 and for capturing biometric signature pattern of the test candidate, and a privacy filter 556 mounted to display 522 to limit the viewing angle of the display 522.

In one embodiment, computing devices 412, 512 can each be a personal computer, particularly OptiPlex 780 Ultra Small Form Factor having an Intel® Core™ 2 Duo E7500 with VT (2.93 GHz, 3M, 1066 MHz FSB) for data processors 414, 514. In another embodiment, computing device 412 is a higher powered computing device than computing device 512 for interacting with a plurality of second apparatuses 510.

In one embodiment, data storage devices 416, 516 can be solid state drives or hard disk drives such as Western Digital 1 TB hard drive. First and second apparatuses 410, 510 can also include data storage such as random access memory for improving the operation of the data processor.

In one embodiment, displays 422, 522 can be CRT or LED-type thin panel displays. In one embodiment, displays 422, 522 can each be a Dell E1909WDD. The at least one input devices 424, 524 can each be a QWERTY-type keyboard 424a, 524a and mouse 424b, 524b such as Dell USB Keyboards and Dell USB Optical Mice. Alternatively, in another embodiment, the at least one input device 424, 524 can be included with the displays 422, 522 in the form of a touch screen display or touch-enabled display such as Elo 1000 Series 1515L Touch Screen Monitor.

In one embodiment, communication links 418, 518 can each provide network connection using a variety of protocols such as TCP/IP and connect to different types of networks such as LAN and WAN and specifically the internet and/or World Wide Web. In one embodiment communication links 418, 518 can each be a 1510 mini PCIe WLAN card.

The at least one biometric recording device 526 can be one or more of a palm print recording device, a palm vein pattern recording device, finger vein pattern recording device, an iris pattern recording device, a retinal pattern recording device, a fingerprint recording device, key stroke biometrics recording device, signature capture writing pad, hand geometry scanning device, voice recording device and facial image recording device such as digital camera or digital video camera. In one embodiment, the at least one biometric recording device can be video camera 526a which can be capable of producing or extracting still images. In another embodiment, the at least one biometric recording device can be fingerprint reader 326b. In yet another embodiment, the at least one biometric recording device can include video camera 526a and fingerprint reader 526b. In yet another embodiment, the at least one biometric recording device can include video camera 526a and fingerprint reader 526b and digital writing pad 554 for capturing test candidate's signature. It is understood that writing pad 554 can also be used to capture and display test candidates note and calculations made during an exam. In one embodiment the video camera 326a can be a high definition web video camera such as Logitech QuickCam Pro 9000, fingerprint reader 526b can be Upek fingerprint reader and digital writing pad 554 can be Wacom's Intous or Bamboo's writing pad.

In one embodiment, overhead camera 538 can be attached to a fixed or extendable arm 558 which is mounted to base portion 560 of apparatus 510. Front facing camera can also be attached to a fixed or extendable arm 562 which can be mounted to base portion 560. Alternatively, both overhead and front facing cameras 538, 540 can be attached to a single fixed or extendable arm. The viewing angle or area can depend on the positioning of the video cameras. In one embodiment, overhead camera 538 can be mounted so as to view an area at least about a 1-10 foot radius extending around the test candidate and front facing camera 540 can view at least about 1-10 feet behind and 1-10 feet to the sides of the test candidate, and rear facing camera 542 can view at least about 1-10 feet behind and about 1-10 feet on both sides of apparatus 510. All the cameras can be digital still or digital video cameras or combinations thereof. In one embodiment all the cameras 538, 540, 542 can be high definition video cameras such as Logitech QuickCam Pro 9000 which also includes a microphone 544.

Figure 16:
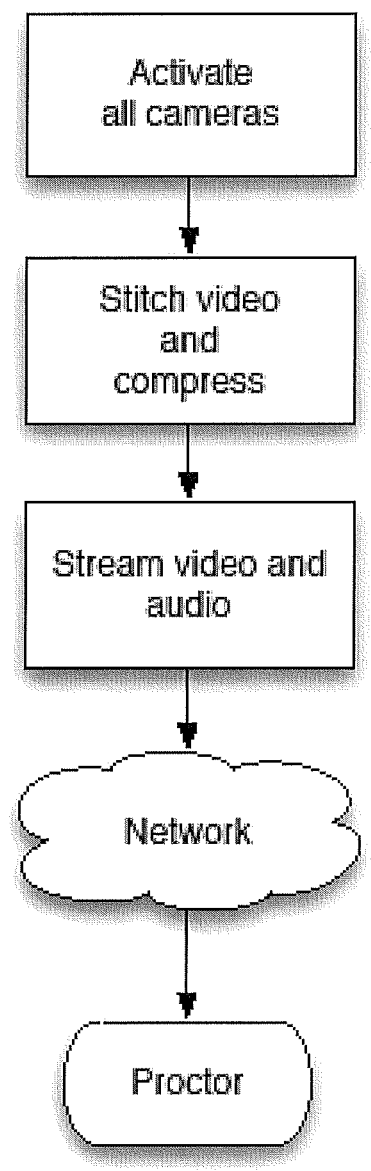
FIG. 16 shows one embodiment of a video stitching process according to the present disclosure.

In one embodiment, in order to assist the proctor at apparatus 410 monitor the one or more candidates and the surrounding environment the multiple video streams from cameras 526a, 538, 540, 542 can be combined into one or more, preferably one, panoramic views by video processing algorithm 564 which can be stored on storage device 516. The stitched video can be stored locally until it can be transmitted to a proctor or streamed in real time depending on the quality of the network connection. One embodiment of this video stitching process is shown on FIG. 16

Video cameras 526a, 538, 540, 542 can cooperate with the object cataloging algorithm 550 stored on the data storage device 516 to catalog and/or detect items or persons and notify the proctor of unauthorized objects such as mobile communication devices, cameras, and/or or other recording or listening devices or persons in the surrounding environment of the test candidate. In one embodiment, the video processing algorithm and stitching process can be developed using Adobe Flash Media Encoder, Lead Technologies' LeadTools Multimedia SDK, Fath Software VideoCapX SDK and Montivisions' DirectShow SDK for Video and Imaging Processing.

Figure 17:
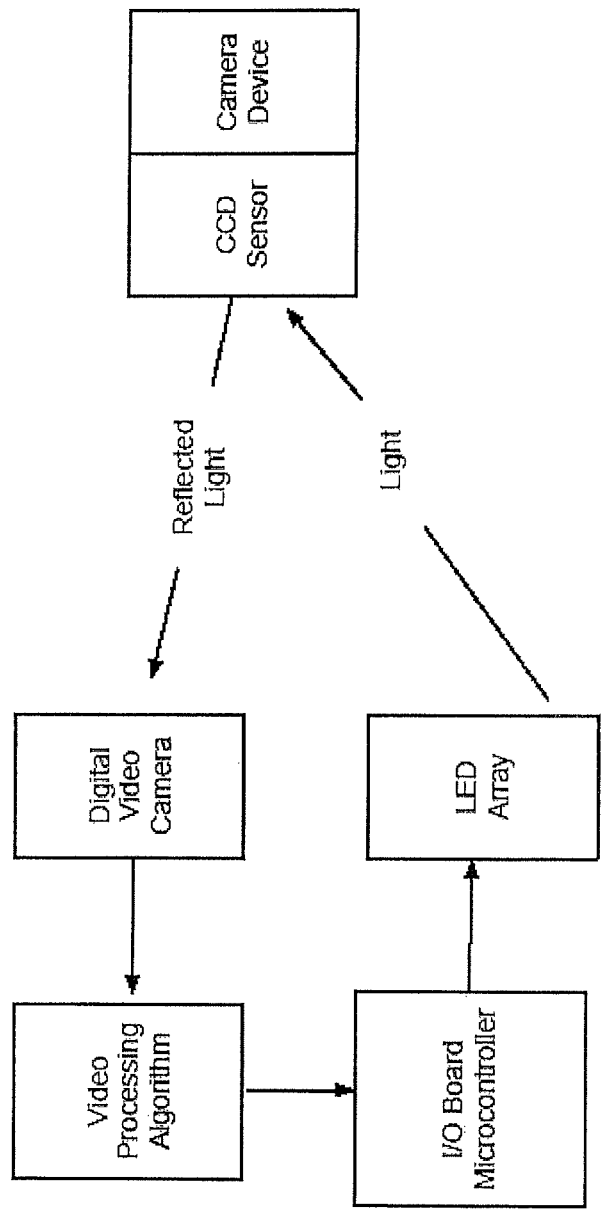
FIG. 17 shows one embodiment of a CMOS/CCD detection and anti-copying system according to the present disclosure.

In one embodiment the CCD/CMOS detection system 548 and anti-copying system 546 can include one or more LEDs directing a specified type of light towards the test candidate and video camera 526a can detect reflection of certain wavelengths of light from any CCD/CMOS that may be pointed towards the display in an attempt to copy the test or test materials. In addition, the specified light can obscure any attempted unauthorized copying of the test or test materials. In one embodiment, the CCD/CMOS and anti-copying systems 548, 546 can include at least one red LED and one infra-red LED and in another embodiment can include at least two of each. It is understood that the cameras 526a, 538, 540 can detect and record the reflected light even if in the infrared spectrum. In one embodiment, video camera 526a can detect and record the reflect light. In one embodiment, the LEDs can be connected to I/O board such as Arduino Duemilanove board which is operably connected to the data processor 514. One embodiment of the CMOS/CCD detection and anti-copying system is shown in FIG. 17.

In one embodiment, a security violation such as detection of any unauthorized items, persons or CCD/CMOS devices can result in notification of the proctor at apparatus 410 or automatic termination of the exam. In one embodiment, the exam can be paused and the display screen can be blackened or a pause screen can be displayed while the proctor or system 3000 can assess the violation. In one embodiment, termination or resumption of the test or testing event can be dependent on the protocol established by the particular testing authority of the testing event. In another embodiment, any security violation can result in termination of the test event.

In one embodiment, privacy filter 556 can allow only persons directly in front or angled no more than 20 degrees from directly in front the display to see the image on screen and preferably on more than 10 degrees from directly in front of the display. In one embodiment, privacy filter 556 can be 3M privacy filter.

Lockable storage compartment 552 can be locked and unlock by apparatus 510. In one embodiment, storage compartment 552 can be locked prior to the start of the exam and opened only after a test candidate initiated pause and not a security related pause or only after termination of the exam.

In one embodiment, system 3000 can perform a registration and admission process as shown in FIGS. 3A and 4 and described as follows.

In one embodiment of a registration process, a test candidate can first register for an event or test. Registration can be performed using any web enabled or connected computer such as home computer or even apparatus 510. Test candidate can access the registration system via a webpage providing communication with apparatus 410. At a welcome screen, the candidate can select the exam or other event requiring registration. A request can be made for candidate to enter registration information such as personal information or login credentials if an account already exists with the registration authority. Registration information such as personal demographic or biographic information including one or more of a name address, date of birth among other information may be requested depending of the particular event or test. In one embodiment, the registration information requested and collected can include information that would be common to several different types of identification documents such as name and birth date.

Apparatus 410 can check this registration information against a database. In one embodiment, database 434 can be stored locally on storage device 416 to determine if the candidate is qualified to sit for the test or event such as by matching the registration information to the information in the database. Alternatively, apparatus 410 can access or communicate with a database of the third party institution such as the testing provider or testing authority responsible for the event or examination to determine whether the test candidate is qualified for the exam. In yet another embodiment, upon entry of the candidate's name, the apparatus can check the locally stored 434 or responsible institution's database without the candidate having to initially select the event.

If the candidate is qualified, the candidate can be requested to pay for the event by entering credit or debit card information or bank wire transfer information, if required. Apparatus 410 can issue a confirmation code and/or provide other information about the admission and test process such as location and identify the particular apparatus designated to perform one or both of the admission and testing process and can also provide information as what identification document documents may be required for admission. If the candidate is not qualified, the candidate can be notified and the webpage can return to the welcome screen.

In another embodiment, before or after selecting the exam or other event requiring registration, a request can be made for log in credentials for a third party account or institution such as Open-ID, OAUTH.net, FACEBOOK, TWITTER, a financial institution, government agency or candidate's employer. Apparatus 410 can forward the log in information or credentials to the third party account and can request registration information such as the name or other information associated with the log in credentials. The candidate may be asked to authorize the third party account to provide registration information to apparatus 410. Additional registration information such as address, date of birth among other information may be requested in addition to the information provided by the third party account or institution.

Apparatus 410 can check this personal information against a database 434 stored locally on storage device 416 or can access a database of the testing authority to determine if the candidate is qualified to sit for the test or event such as by matching the personal information to the information in the database. Alternatively, apparatus 410 can access a database of the third party institution responsible for the event or examination to determine whether the test candidate is qualified for the exam. Alternatively, upon entry of the candidate's name or other information, the apparatus can check the local database 434 or responsible institution's database without the candidate having to select the event before hand.

If the candidate is qualified, the candidate can be requested to pay for the event by entering credit or debit card information or bank wire transfer information, if required. Apparatus 410 can issue a confirmation code and/or other information about the admission and test process such as location and identify the particular apparatus designated to perform one or both of the admission and testing process and can also provide information as what identification document documents may be required for admission. If the candidate is not qualified, the candidate can be notified and the webpage can return to the welcome screen.

Following the registration process, test candidate can go to the admission and testing location at the time and date specified by the information provided after successful registration process to perform an admission process and/or testing event. In one embodiment, the admission process can determine the authenticity and validity of the candidate's identification document and can authenticate the identity of the candidate via comparison of biometric data captured from the identification document and biometric data captured from the test candidate. In one embodiment, the authentication of test candidate's identity and validation and authentication of identification documents can follow the process outlined in FIG. 4. In one embodiment, a welcome screen such as shown in FIG. 5 can greet the test candidate and can provide details as to the identification such as by a "station number" and the location of apparatus 510 which can verify the information included in the information provided by apparatus 410 following registration. Test candidate can select "Next" to proceed.

In one embodiment, the candidate can then be presented with a "Find Reservation" screen such as shown in FIG. 6 prompting the candidate to enter either the confirmation code provided by apparatus 410 following registration or other information to determine if the test candidate has been registered to proceed with the event or exam. Once the confirmation code or other information is entered, apparatus 510 can communicate with apparatus 410 to verify that the code or other information is valid and the test candidate can proceed. If the code or information is not found, the candidate can be prevented from proceeding with the next step and can instead be returned to reenter the confirmation code or other information. In one embodiment, the process is terminated after several failed tries at entering a valid confirmation code.

In one embodiment, if the confirmation code or other information is found, first apparatus 410 can communicate some or all of the registration information provided during registration to apparatus 510. In one embodiment, a "Reservation Confirmation" screen such as shown in FIG. 7 can be displayed by apparatus 510 providing information such as the name of the test candidate, the sponsor or testing authority, the name of the event or exam, time and length of the event.

The next step can be either the scanning of the test candidate's identification information or capturing biometric data form the test candidate. In one embodiment, depending on the requirements of the particular event or exam, scanning of an identification document may not be required. For example, in one embodiment, the event may be a training exercise or an employer sponsored test, in which the employer or other testing authority may only require corporate or employer account log-in credentials and biometric data such as image of the test candidate's face or facial image to be captured and included in a final report at the conclusion of the event. The employer or other testing authority may have knowledge of the appearance of the particular biometric data of the test candidate such as the facial appearance of the candidate and can authenticate the candidate by visually inspecting the facial image when reviewing the final report accompanying the results of the event without requiring the captured facial image of the candidate to be compared with facial image from an identification document. In another embodiment, neither scanning of an identification document or capture of biometric data from a test candidate may be required.

In one embodiment, both scanning of an identification document and the capture of biometric data from a test candidate may be required and can be performed in any order. In one embodiment, scanning of a identification document can be performed first as shown in FIG. 4. Accordingly, in one embodiment, a screen such as "Scan ID" shown in FIG. 8 can be displayed to the test candidate requesting that the candidate place an identification document on scanning device 520 and can provide an illustration of the act. The document scanning device 520 can capture identification data which as discussed above can include textual information, biometric information such as a facial image or fingerprint pattern depending on the particular identification document and security and/or anti-counterfeit indicia that may be present on the identification document. In one embodiment, the scanned identification document can be displayed as shown in FIG. 9.

In one embodiment, the security and anti-counterfeit indicia examined can include indicia present in the visible, ultraviolet and near infrared spectra as shown by the screen shots in FIGS. 10 and 11. The document scanning and comparison algorithm 530 can compare the security and anti-counterfeiting indicia captured from the identification document to database 532 to determine if the identification document is authentic and/or valid, and the textual information extracted from the identification document can be compared to the registration information communicated to apparatus 510 by apparatus 410 to determine if they match. This information may or may not be presented to the candidate. Alternatively, the information data extracted from the identification document can be communicated to apparatus 410 for comparison by apparatus 410 to determine if they match. It is understood that in such cases apparatus 410 can include the document scanning and comparison algorithm and the security and anti-counterfeiting database.

In one embodiment, if the relevant extracted identification document information do not match the registration information and the security or anti-counterfeit indicia do not match the expected indicia of database 532, the admission process can be terminated and the test candidate can be informed of the same. In another embodiment, the candidate can be instructed to scan the sane or a different identification document or else the process can be terminated. In another embodiment, if there is a match between the security and anti-counterfeiting indicia extracted from the identification document and the indicia of database 532 and the textual information extracted from the identification information document match the registration information then the identification document can be deemed valid and authentic and candidate registration data is deemed valid. The test candidate can proceed to the next portion of the admission process which can include capture of biometric data from the test candidate.

The biometric data captured from the test candidate can depend on the biometric data present on the identification document. Typically, many identification documents include a facial image. Some identification documents may include more than one set of biometric data such as a facial image and one or more fingerprint patterns. In such cases, selection of which one or more biometric data to capture from the test candidate for comparison with one more biometric data appearing on one more identification documents can be determined by each testing or event planning authority to satisfy identity authentication of the candidate. In one embodiment, the biometric data captured from one identification document can be compared with the analogous biometric data from the test candidate. In one embodiment, a facial image is captured from the identification document and a facial image is captured from the test candidate for comparison to authenticate the test candidate.

In one embodiment, apparatus 510 can display a "Take Photo" screen as shown in FIG. 12 instructing that a photo can be captured by clicking of the "Take Photo" button. Apparatus 510 can display the video feed of video camera 526a so as to permit the candidate to align and pose for the photo. The image or photo taken of the test candidate can be compared against the image captured from the identification document by biometric data processing algorithm 527, such as face recognition software. Alternatively, the face recognition or other biometric data processing algorithm can reside with apparatus 410 and the relevant data captured by apparatus 510 can be communicated to apparatus 410 for comparison by apparatus 410. In yet another embodiment, the image or photo taken of the test candidate can be compared against the image captured from the identification document by the human proctor stationed at apparatus 410.

If the biometric data match, the admission process can be completed and the exam or other event can proceed. In one embodiment, a digital signature can be requested and captured by digital writing pad to complete the admission process.

In another embodiment, apparatus 510 can request to capture an additional form of biometric data from the test candidate. This additional capture of biometric data can also be authenticated against the same type of biometric data appearing on the identification document. In one embodiment the additional biometric data can be used in subsequent comparisons of biometric data to revalidate the identity of the test candidate. In one embodiment, testing candidate is requested to scan a particular finger using fingerprint reader 526b to capture a fingerprint pattern.

As shown in FIG. 4, test candidate can be directed to a testing station and thus completing the admission process. Since testing station can be apparatus 510 the test candidate need not be directed to a testing station and can instead be informed that the admission process is complete and testing process can begin. Apparatus 510 can present information concerning testing protocols which may have been establish by the testing authority before the exam begins such as shown in screen shot of FIG. 18. In one embodiment, prior to beginning the exam, test candidate can be inform to place any unauthorized objects such as mobile communication devices, cameras, and/or other recording or listening devices in the storage compartment 552 which can be locked until termination of the exam or even after a pause of the exam depending on the testing protocol established. In one embodiment, storage compartment can be unlocked only after termination of the exam.

Figure 19:
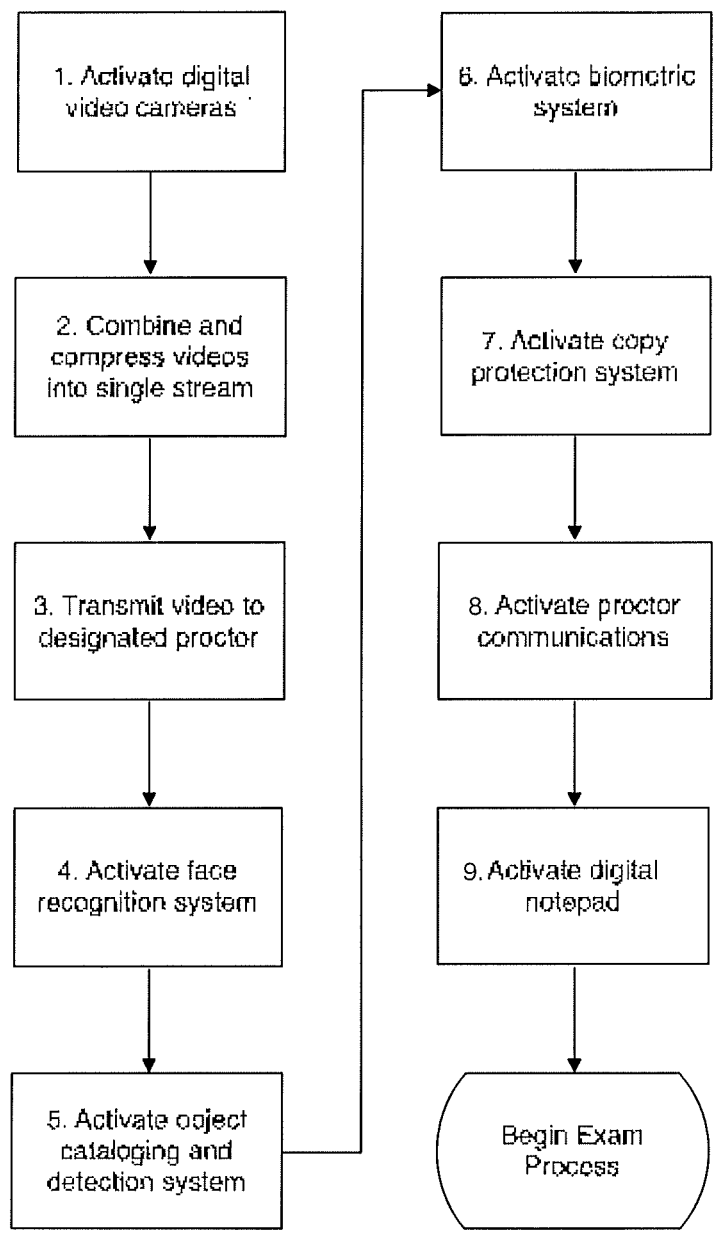
FIG. 19 shows one embodiment of security systems initialization of a remote testing apparatus according to the present disclosure.

In one embodiment, apparatus 510 can activate the security systems of apparatus 510 as shown in FIG. 19 before display of exam can begin. The exam can be stored on either of first or second apparatus 410, 510 or even stored by a third party testing authority. If the exam is stored anywhere other than the second apparatus 510, the second apparatus can communicate with the first apparatus 410 or third party testing authority to request transmission of the exam to second apparatus 510. In one embodiment, the exam can be stored by the third party testing authority and is transmitted or streamed to the second apparatus. As the test candidate answers questions, the answers can be transmitted or streamed back to the testing authority in real time or can be stored locally and then transmitted to second apparatus or the third party testing authority. If the answers are transmitted to the first apparatus 410, apparatus 410 can store them or transmit them to the third party testing authority. In one embodiment, the answers can be transmitted approximately in real time to the testing authority.

Timing of the test such as time permitted per question or per section of the test can be establish by the testing authority and managed and/or controlled by apparatus 510 or by the testing authority through control of the streaming process. In one embodiment, apparatus 510 manages and/or controls timing of the exam according to predetermined timing protocols established by the testing authority.

Figure 21:
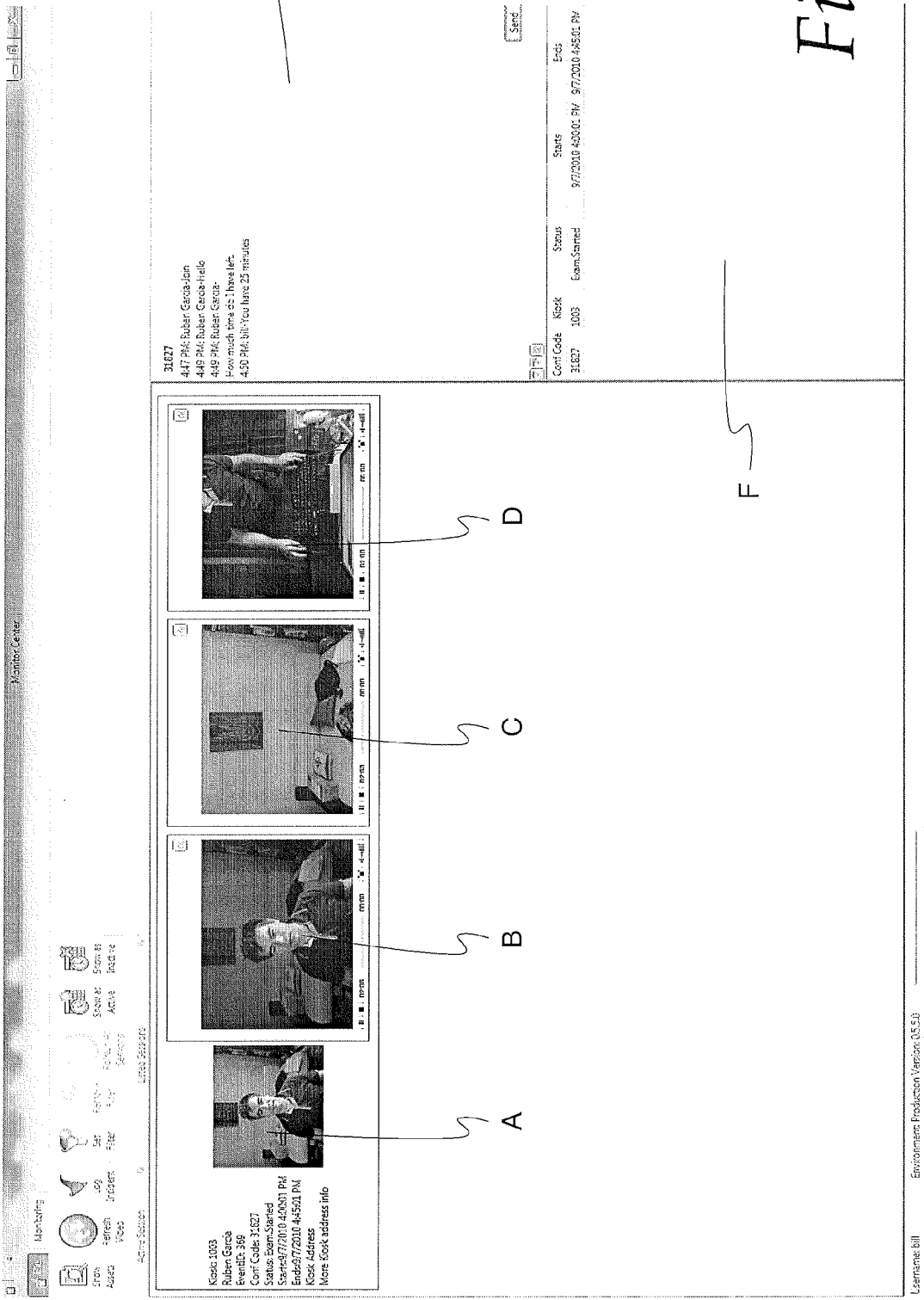
FIG. 21 shows one embodiment of a view from a remote proctor station according to the present disclosure.

FIG. 20 shows one embodiment of a test question presented to a testing candidate. As is shown in the FIG. 20, live support can be provided via text chat protocol and/or audio/visual communication with the remote proctor. FIG. 21 shows one embodiment of the view of the remote proctor stationed at apparatus 410. In one embodiment frame "A" can be the authenticated biometric data captured from test candidate during admission process, frame "B" can show the video stream from video camera 526a, frame "C" can show the video stream from front facing video camera 540, frame "D" can show the video stream from overhead video camera 538, frame "E" can show one embodiment of text chat communication between the proctor and the test candidate and frame "F" can show all the active apparatuses 510.

Figure 22:
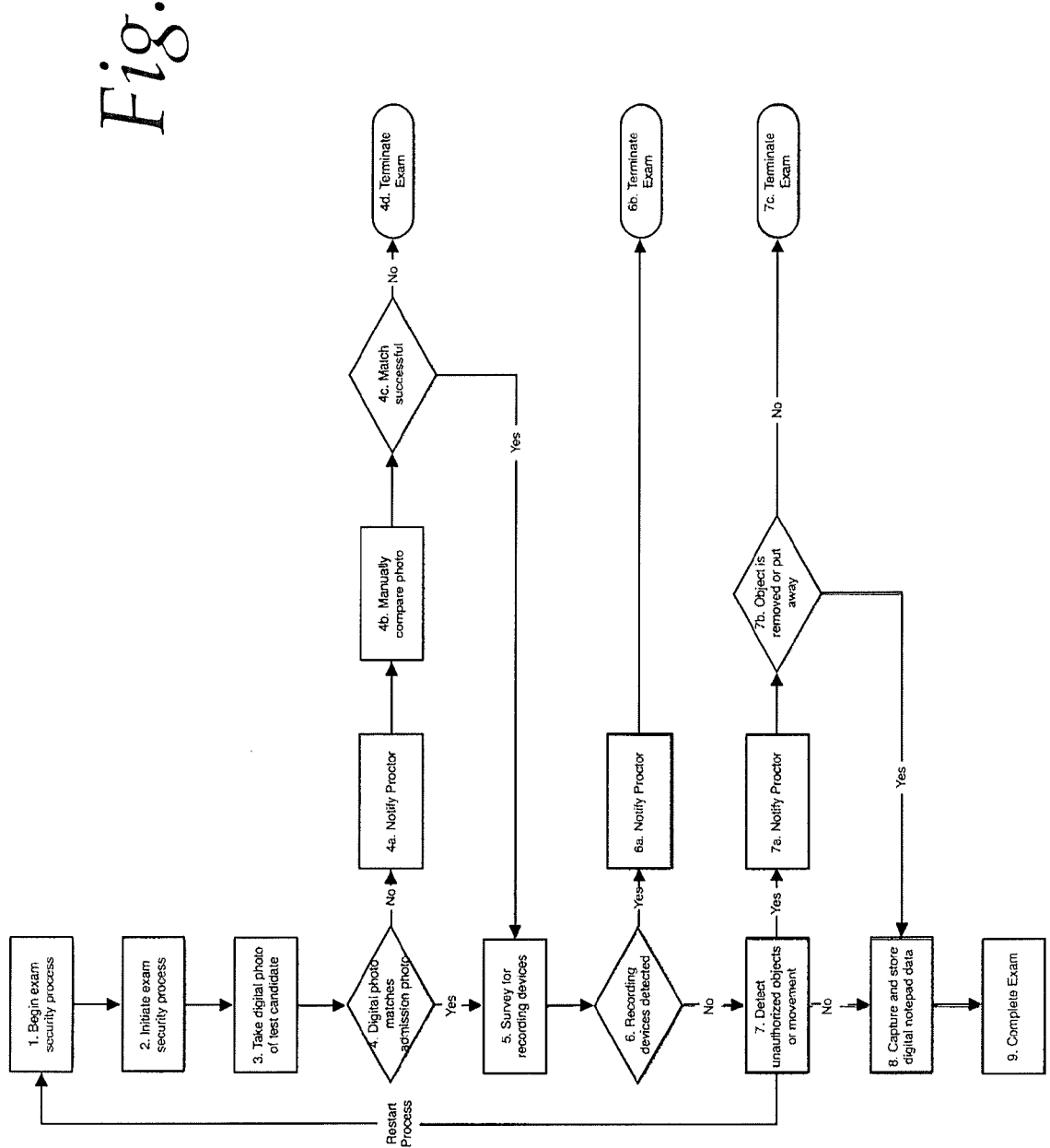
FIG. 22 shows one embodiment of security processes of a remote testing apparatus according to the present disclosure.

During the exam, security processes such as intermittent or regularly scheduled biometric data capture from candidate for comparison with previously captured biometric data, preferably captured from identification document, anti-copying, CCD/CMOS detection and unauthorized object detection systems can operate on a continual or intermittent basis. In one embodiment, anti-copying, CCD/CMOS detection and unauthorized object detection systems can operate on a continual basis and biometric data capture from test candidate and comparison with previously captured identification document biometric data occurs intermittently. In another embodiment, anti-copying, CCD/CMOS detection and unauthorized object detection systems can operate on an intermittent basis except that when the exam is paused for any reason at which time any restart of the exam is preceded by initiation and operation of anti-copying, CCD/CMOS detection and unauthorized object detection systems and biometric comparison. One embodiment of a security processes is shown in FIG. 22.

Violation of any of the security systems can result in pause of the exam, notification of the remote proctor and/or termination of the exam depending on the testing protocol established by the third party testing authority. The proctor can be given authority to resume the exam after any security system violation. Alternatively, the process is automatic and the proctor may not be permitted to override the termination of the exam for some or any security system violation.

Any restart of the exam can also be preceded by a re-authentication of the test candidate through a biometric comparison wherein biometric data captured from the test candidate prior to restart of the exam is compared with one or more of the biometric data captured from the identification document and properly authenticated biometric data captured during the admission process. In one embodiment, the biometric data captured from the testing candidate prior to restart of the exam can be compared to the biometric data captured from the identification document. In another embodiment, a facial image and/or fingerprint can be captured prior to restart of the exam and compared to the facial image and/or fingerprint captured from the identification document unless a fingerprint pattern is not included as part of the identification document information in which case the fingerprint captured from the test candidate can be compared to the fingerprint captured from the test candidate during the admission process.

Figure 23:
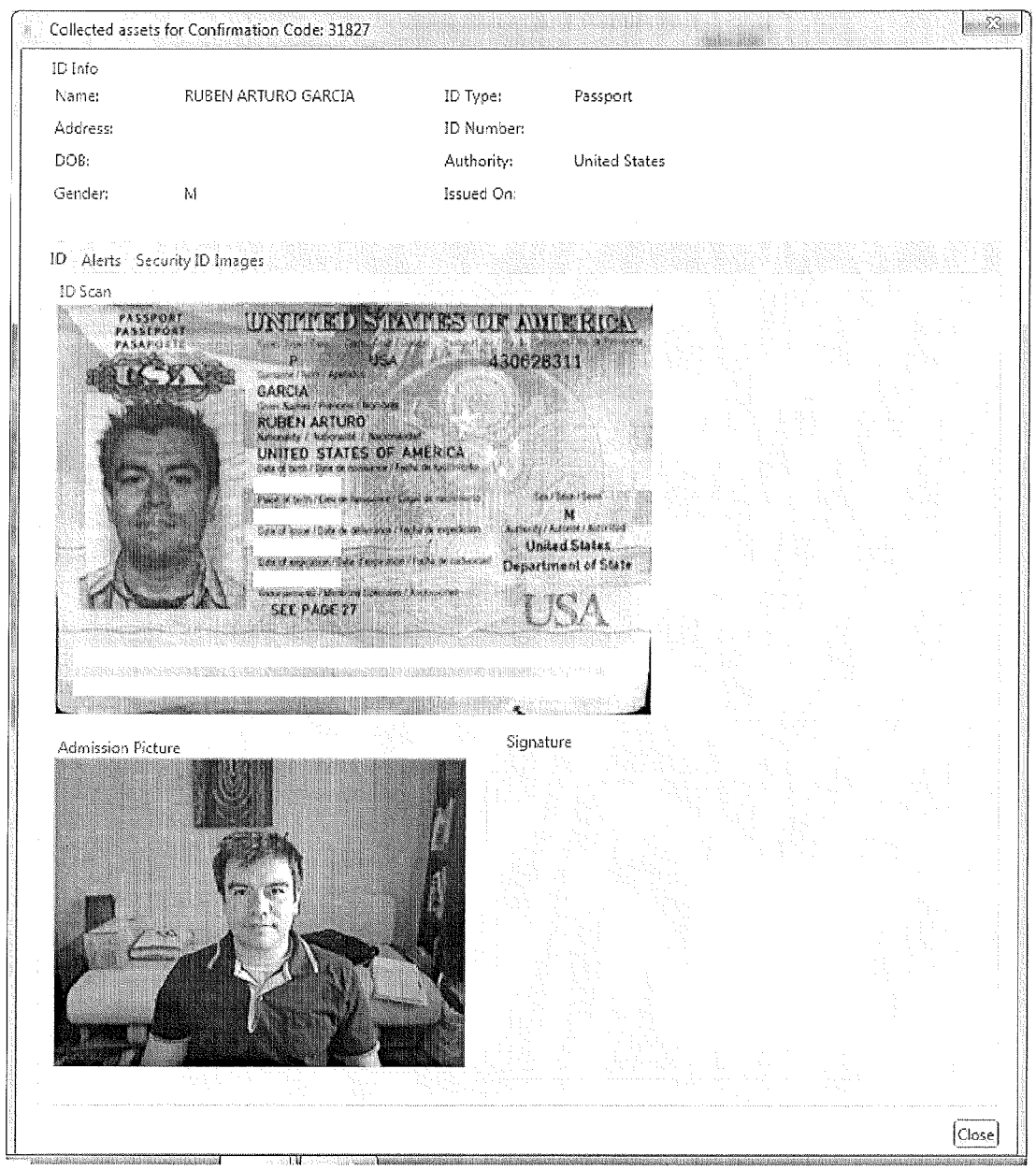
FIG. 23 shows one embodiment of a screen shot displaying biometric data captured from an identification document and for a testing candidate for viewing by a proctor at a remote proctor apparatus according to the present disclosure.

During the testing process, the testing candidate may need to request a pause in the exam such as for unscheduled restroom breaks. The second apparatus 510 can include a pause button or other way to pause the exam with or without intervention of the remote proctor. In one embodiment a pause button link can appear along with the displayed exam which can be accessed by the testing candidate without intervention of a proctor. In one embodiment initiation of the pause feature pauses the exam and either obscures or blackens the display screen or jumps to a pause screen to avoid allowing the testing candidate from studying the particular question being displayed at the time of the pause for longer than an established time period. In one embodiment, in order to resume or restart the exam, the candidate accesses a resume button or link. The second apparatus 510 can then request identity authentication. In one embodiment, second apparatus can capture biometric data such as facial image or fingerprint pattern from the test candidate for comparison against for example identification document biometric data by either of the apparatuses 410, 510 through automated process such as through the biometric data processing algorithm or even by the remote proctor. The remote proctor can have at ready disposal the biometric data captured from the test candidate and the scan of the identification document as shown in one embodiment in FIG. 23. Once testing candidate's identity has been re-authenticated the exam can be allowed to resume or restart from the point left off at the pause.

Also, during the exam, test candidate can utilize the digital writing pad 554 to take notes or make calculations which are displayed for viewing by the test candidate. These notes may be viewable to the proctor at apparatus 410. Such notes can be recorded and stored as part of the record of the exam. After candidate has completed the exam, a final request and capture of biometric data can occur. In one embodiment, the signature of the test candidate is record.

At the end of the exam, second apparatus 510 can provide a report of the exam process. The report can include the entire recorded exam. In one embodiment, the record can include including the audio/video feeds, information data captured from the identification document and an image of the identification document, biometric data captured from test candidate, biometric data checks occurring during registration, admission and testing process, notes and/or calculations captured by the digital writing pad, and security system checks. In another embodiment, the report can include test results, one or more digital signature captures, the number pause, the time the pauses occurred, biometric data captured from the identification document and/or the testing candidate taken at any point during the admission or testing process. In one embodiment, the report includes the test responses of the candidate, facial image and signature of the test candidate taken during the admission process, the digital image after all pauses of the testing process and a final signature.

While the present approach has been described in detail with reference to the foregoing embodiments, other changes and modifications may still be made without departing from the spirit or scope of what is disclosed. It is understood that the methods, compositions and polymers described herein are not to be limited by the embodiments described herein. Indeed, the true measure of the scope of the present approach is defined by the appended claims including the full range of equivalents given to each element of each claim.

The invention claimed is:

1. A test candidate registration, admission and test administration system comprising:
a first apparatus including a first processor, a first data storage device operably connected to the first processor, a first communication link operably connected to the first processor for transmitting and receiving data over a network, a first display operably connected to the first processor, and a first at least one input device operably connected to the first processor, wherein the first apparatus receives registration information of a test candidate and serves as a remote administration station;
a second apparatus including a second processor, a second data storage device operably connected to the second processor, a second communication link operably connected to the second processor for transmitting and receiving data over the network and communicating with the first apparatus, a scanning device operably connected to the second processor to capture identification information from a test candidate's identification documents, a second display operably connected to the second processor, a second at least one input device operably connected to the second processor, and at least one biometric data recording device operably connected to the second processor for capturing biometric data of the test candidate, wherein the second apparatus captures biometric data and either provides testing admissions functions and/or identity authentication;
wherein the identification information includes textual information and biometric information including one or more of a facial image and finger print pattern, and the scanning device also captures security or anti-counterfeit indicia from the identification document in visible and/or non-visible light spectrum;

a biometric data processing algorithm stored on one or both of the first and second apparatus for comparing biometric data;

a document scanning and comparing algorithm stored on one or both of the first and second data storage device for extracting text, images and other indicia from the identification document information of the identification document and comparing identification information to registration information, wherein either the second apparatus transmits the identification information and the biometric data captured from the test candidate to the first apparatus which compares the identification information and the biometric data captured from the test candidate to authenticate the identity of the test candidate or the second apparatus compares the identification information and the biometric data captured from the test candidate to authenticate the identity of the test candidate and allow the test candidate to take a test;

wherein the second apparatus administers a test to the test candidate and includes a copy protection system operably connected to the processor of the second apparatus for preventing copying of displayed test information wherein the copy protection system comprises a CCD and/or CMOS detection system.

2. The system according to claim 1 wherein the second apparatus includes one or more recording devices for capturing the test candidate taking the test for transmission to the first apparatus for remote proctoring of the test by a remote test proctor.

3. The system according to claim 2 wherein the one or more recording devices for capturing the test candidate taking the test include a microphone for recording sound, an overhead video camera for recording a downward view of the test candidate, a front facing video camera for recording the environment behind the test candidate and a rear facing video camera for recording the environment behind the second apparatus.

4. The system according to claim 3 wherein the second apparatus includes a video data processing algorithm for combining video feeds from the overhead, front facing and rear facing video cameras as a single video feed for storage on the second data storage device and/or for transmission over the network via the communication link to the first apparatus.

5. The system according to claim 2 wherein the second apparatus includes a microphone, and either a headphone or one or more speakers for allowing a user to audibly communicate with the proctor over the network via the second communications link.

6. The system according to claim 1 wherein the at least one biometric data recording device includes one or more of a palm print recording device, a palm vein pattern recording device, finger vein pattern recording device, an iris pattern recording device, a retinal pattern recording device, a fingerprint recording device, key stroke biometrics recording, signature capture writing pad, hand geometry scanning device, voice recording device and facial image recording device such as digital camera or digital video camera.

7. The system according to claim 6 wherein the at least one biometric recording device is a digital video camera facing a user of the apparatus and having the ability to record a digital still image of the test candidate's face.

8. The system according to claim 1 wherein the second apparatus includes the document scanning and comparing algorithm and compares the textual information to the registration information received from the first apparatus and compares the biometric data from the identification document against biometric data captured from the test candidate to authenticate the identity of the test candidate.

9. The system according to claim 1 wherein upon authentication of the test candidate's identity the second apparatus initiates the one or more recording devices, and the copy protection system and receives the test from a third-party testing authority for viewing on the second display.

10. The system according to claim 1 wherein the second apparatus includes a database of security and anti-counterfeiting indicia provided on the identification document and the document scanning and comparing algorithm compares the security and anti-counterfeiting indicia captured from the identification document against the database of security and anti-counterfeiting indicia to authenticate the identification document.

11. The system according to claim 1 wherein said test candidate accesses the first apparatus using a network connected computer and enters and transmits the registration information including one or more of name, address, date of birth, and selects the test to be administered and the first apparatus transmits to the test candidate a confirmation code to begin an admission process including authentication of the test candidate's identity by the second apparatus.

12. A test candidate registration, admission and test administration system comprising:

a first apparatus including a first processor, a first data storage device operably connected to the first processor, a first communication link operably connected to the first processor for transmitting and receiving data over a network, a first display operably connected to the first processor, and a first at least one input device operably connected to the first processor, wherein the first apparatus receives registration information of a test candidate and serves as a remote administration station;

a second apparatus including a second processor, a second data storage device operably connected to the second processor, a second communication link operably connected to the second processor for transmitting and receiving data over the network and communicating with the first apparatus, a scanning device operably connected to the second processor to capture identification information from a test candidate's identification documents, a second display operably connected to the second processor, a second at least one input device operably connected to the second processor, and at least one biometric data recording device operably connected to the second processor for capturing biometric data of the test candidate, wherein the second apparatus captures biometric data and either provides testing admissions functions and/or identity authentication;

a biometric data processing algorithm stored on one or both of the first and second apparatus for comparing biometric data;

a document scanning and comparing algorithm stored on the second data storage device for extracting text, images and other indicia from the identification document information of the identification document and comparing identification information to registration information, wherein the identification information includes textual information and biometric information and the second apparatus compares the textual identification information to the registration information received from the first apparatus and compares the biometric identification information from the identification document against the biometric data captured from the test candidate to authenticate the identity of the test candidate and allow the test candidate to take a test; and a copy protection system for preventing copying of displayed test information, wherein the copy protection system comprises a CCD and/or CMOS detection system.

13. The system according to claim 12 further including a third apparatus having a third processor, a third data storage device operably connected to the third processor, a third communication link operably connected to the third processor for transmitting and receiving data over the network and communicating with the first and second apparatus, a third display operably connected to the third processor, at least one input device operably connected to the third processor, and a second biometric data recording device operably connected to the second processor for capturing biometric data of the test candidate, wherein the first or second apparatus authenticates the identity of the test candidate by comparing biometric data captured from the identification document and the biometric data captured from the test candidate and upon authentication of test candidate's identity directs the test candidate to the third apparatus for presentation of the test; and wherein the third apparatus includes the copy protection system and the copy protection system is operably connected to the processor of the third apparatus.

14. The system according to claim 13 wherein the third apparatus captures biometric data of the test candidate and transmits the captured biometric data to the second apparatus to authenticate the identity of the test candidate prior to displaying the test.

15. The system according to claim 13 wherein the third apparatus transmits to the first apparatus the biometric data captured from the test candidate and the second apparatus transmits to the first apparatus the biometric data captured from the identification document and the first apparatus compares the biometric data to authenticate the identity of the test candidate prior to displaying the test.

16. A method of authenticating a test candidate identity comprising the steps of:
- obtaining identification information from the test candidate;
- capturing a first set of biometric data from the test candidate;
- capturing identification information form an identification document wherein the identification information comprises biometric data and textual identification data including one or more of a facial image and finger print pattern;
- capturing security or anti-counterfeit indicia from the identification document in the visible and/or non-visible light spectrum;
- comparing the first set of biometric data with the identification document biometric data;
- determining if the biometric data match;
- allowing the test candidate to access a test if the biometric data match;
- providing the test to the test candidate by displaying test information;
- employing a copy protection system for preventing copying of displayed test information;
- recording and/or transmitting to a remote administration center the test candidate taking the test;
- storing or transmitting the test candidate's responses to test;
- intermittingly capturing of test candidate's biometric data;
- comparing intermittent capture of test candidate's biometric data with first set of biometric data; and
- terminating and/or alerting remote administration apparatus if the intermittent biometric data does not match the first set of biometric data.

* * * * *